United States Patent
Felts, III et al.

(10) Patent No.: US 6,175,389 B1
(45) Date of Patent: Jan. 16, 2001

(54) COMB FILTERED SIGNAL SEPARATION

(75) Inventors: Benjamin E. Felts, III, Cardiff; John E. Welch, Encinitas, both of CA (US)

(73) Assignee: Conexant Systems, Inc., Newport Beach, CA (US)

(*) Notice: Under 35 U.S.C. 154(b), the term of this patent shall be extended for 0 days.

(21) Appl. No.: 09/244,642

(22) Filed: Feb. 4, 1999

(51) Int. Cl.[7] .................................................. H04N 9/78
(52) U.S. Cl. ........................ 348/663; 348/665; 348/668
(58) Field of Search ................................ 348/663, 665, 348/667, 668, 669, 670, 705; H04N 9/77, 9/78

(56) References Cited

U.S. PATENT DOCUMENTS

| | | | |
|---|---|---|---|
| 4,355,333 | * 10/1982 | Sato | 348/665 |
| 4,470,069 | * 9/1984 | Lewis, Jr. | 348/665 |
| 4,532,542 | * 7/1985 | Andrews | 348/663 |
| 5,161,006 | * 11/1992 | Monta | 348/663 |
| 5,231,476 | * 7/1993 | Mawatari | 348/663 |
| 5,457,501 | * 10/1995 | Hong | 348/668 |
| 5,475,445 | * 12/1995 | Yamaguchi | 348/663 |

OTHER PUBLICATIONS

Bradford, Steven, "A Simplified Guide to the NTSC Video Signal," *NTSC Video Signal Basics*, http://www.seanet.com/users/bradford/ntscvideo.html.

Rogers, Greg, "Video Signal Formats," *Video Signal Formats*, http:cybertheater.com/Tech_Archive/YC_Comp_Format/yc_comp_format.html.

\* cited by examiner

*Primary Examiner*—Sherrie Hsia
(74) *Attorney, Agent, or Firm*—Lyon & Lyon LLP

(57) ABSTRACT

An adaptive signal separation system and method for quadrature amplitude modulated signals that is particularly well-suited for YC separation of a composite television signal. An adaptive approach for separating overlapping signals wherein the adaptive approach selects between notch or equivalent filtering and a comb filtering system, wherein the chrominance is first demodulated to the IQ domain prior to comb filtering. The demodulated comb filtered IQ data streams are then re-modulated to reconstruct the luminance portion of the signal.

22 Claims, 27 Drawing Sheets

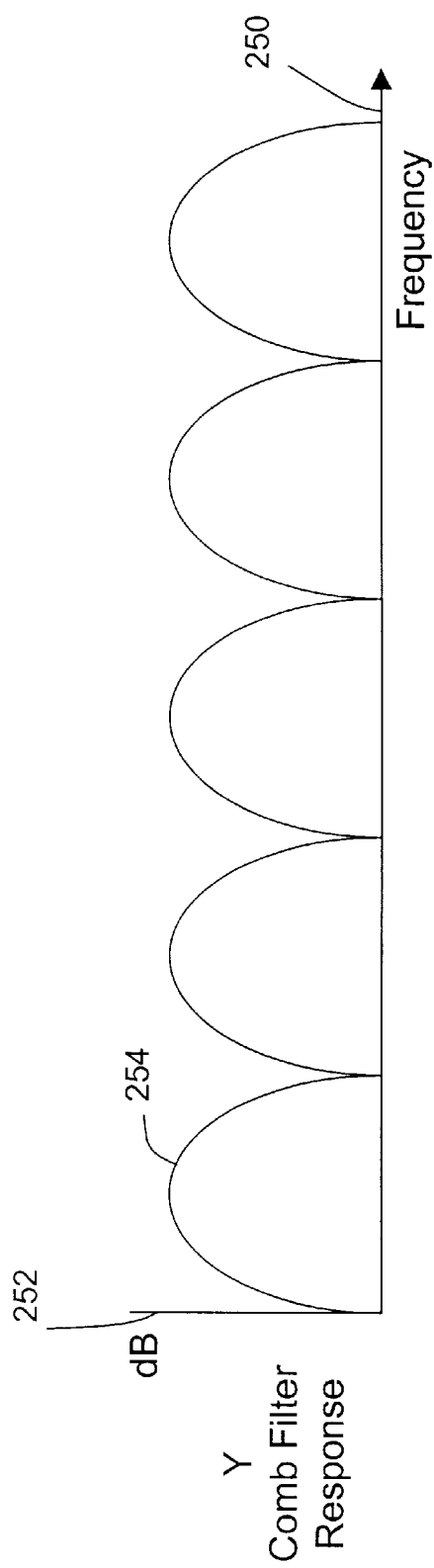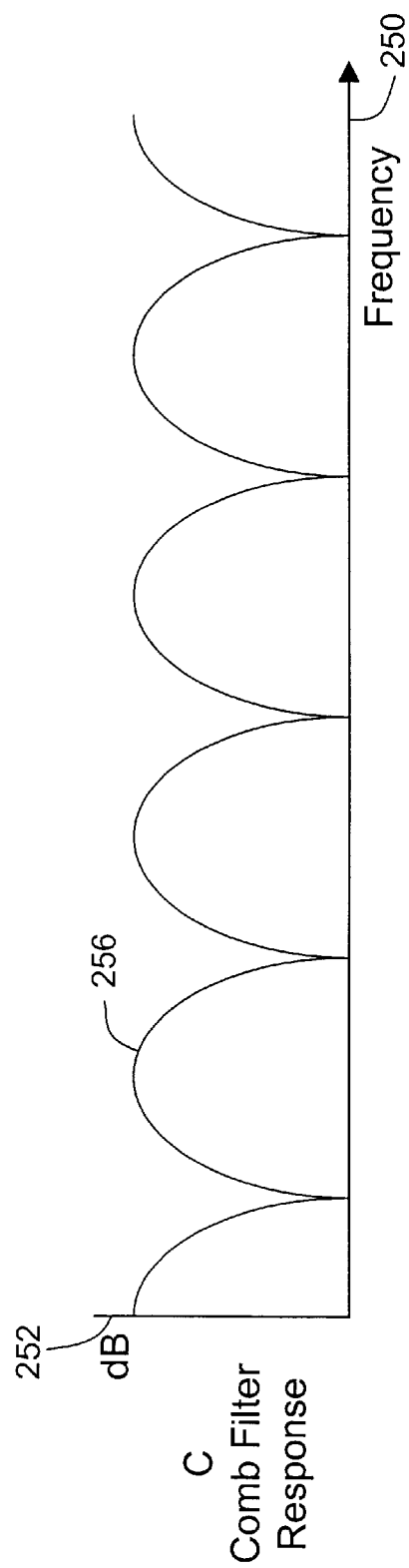

COMB FILTERED SIGNAL SEPARATION

BACKGROUND OF THE INVENTION

1. Field of the Invention

The present invention generally relates to an improved comb filter system and method, and in particular an improved system and method for separation of composite signals.

2. Background

Due to limitations on available bandwidth and the increased demand to transmit additional information on existing bandwidth, it is often necessary to multiplex or combine two or more information signals into a single composite signal.

A color television signal is an example of a composite signal. A color television signal comprises a luminance (brightness) component and a chrominance (color) component. These components are often represented as Y and C components wherein Y represents the luminance component and C represents the chrominance component.

Originally, broadcast television in the United States began with black and white broadcast and therefore lacked the chrominance component, C, of modern television's composite signal. Television standards and technology required that the black and white television signal, that is, the luminance component (Y), reside within 6 megahertz (MHz) of bandwidth space.

Eventually, however, technology advanced to provide color television. To allow black and white televisions to receive the new color signal broadcast, the color signal standard located the color information within the same 6 MHz of bandwidth space allotted to each channel of the black and white signal. Under this standard, the color information overlaps with the luminance information.

FIG. 1 illustrates a composite television signal on a coordinate system in which the horizontal axis 100 represents frequency and the vertical axis 102 represents amplitude. Signal line 104 represents the luminance information (Y) while line 106 represents the chrominance information (represented as I and Q) of the composite signal. As shown, the frequencies of these signals 104, 106 overlap. In an NTSC (National Television Standards Committee) system, the luminance information occupies the range DC to 5.5 MHz of bandwidth while the chrominance signal is band-limited to the range approximately 0.6 to 1.3 MHz and is modulated onto a carrier at 3.58 MHz. The audio portion of the signal is at 4.5 MHz. While these two data signals conveniently fit within the 6 MHz of bandwidth space they are allotted, obvious decoding challenges are presented in order to separate the luminance information from the chrominance information.

The first decoding scheme adopted to separate the overlapping luminance (Y) and chrominance (C) signals comprises simple notch filtering in combination with band pass filtering. FIG. 2 illustrates a block diagram of a basic notch filter 152 and band pass filter 154. An incoming composite signal on line 150 is presented to both of the notch filter 152 and the band pass filter 154.

FIG. 3 illustrates the frequency response of a notch filter 152 and a band pass filter 154. The output of the notch filter generally comprises the luminance portion 174 of the composite signal while the output of the band pass filter generally comprises the chrominance portion 176 of the composite signal.

In particular, for NTSC video, the notch filter removes a portion of the composite signal centered at 3.58 MHz, but allows the remainder 174 to pass. While the notch filter 152 allows the majority of the luminance information 174 to pass, it undesirably removes components of the luminance signal having frequencies within the range of the notch filtered frequencies 177. The notch filtered frequencies that are removed range from 2.5 to 4.5 MHz. Stated another way, the notch filter allows the frequency band below 2.5 MHz and the frequency band above 4.5 MHz to pass.

The band pass filter 154 configured to operate in accord with the NTSC standard video allows a 2 MHz portion of the composite signal centered at 3.58 MHz to pass while removing portions outside of this band. This portion of the composite signal contains all the chrominance information. Undesirably, however, the output of the band pass filter also contains luminance components having frequencies within the band pass filter's frequency band.

Notch and band pass filtering suffers from numerous drawbacks as can easily be understood with reference of FIG. 3. In particular, the band pass filtered chrominance portion of the composite signal also contains luminance information, i.e., band pass filtering does not remove all luminance information from the chrominance signal. The unwanted luminance information in the chrominance signal introduces artifacts into the video image. This is most noticeable in pictures that contain closely spaced black and white lines, such as when the video display is of person is wearing a herringbone jacket.

Likewise, notch filtering the composite signal to remove the chrominance information from the composite signal to obtain the luminance information removes valuable portions of the luminance signal. A loss of luminance information is especially critical due to the human eye's sensitivity to brightness and contrast variations in a projected image.

Therefore, a need exists for a method and apparatus for video separation that is more robust than prior systems, requires less memory, and more completely separates the components of the composite signal.

SUMMARY OF THE INVENTION

In accordance with the purpose of the invention as broadly described herein, there is provided a method and apparatus for separating overlapping components in a composite signal, such as for example, separating the chrominance and luminance components in a quadrature amplitude modulated (QAM) signal. A novel technique is employed in which the composite signal is notch filtered to create a luminance signal containing all but a portion of the luminance components. The composite signal is also band passed filtered to create a chrominance signal containing all the chrominance components and the luminance components missing from the luminance signal.

Next, the chrominance signal is demodulated from the subcarrier frequency. Thereafter, the demodulated chrominance signal is comb filtered to separate the luminance components from the chrominance components. The chrominance signal is thus isolated.

Next, the isolated chrominance signal is subtracted from the original chrominance signal that contains the luminance components to yield a signal comprising only luminance components.

This luminance components signal is next remodulated and added back to the original luminance signal that is missing these luminance components. The entire luminance signal is thus created.

In an alternative embodiment, the sampling rate, i.e. format, of the demodulated chrominance signal is modified prior to comb filtering to reduce memory and processing requirements. This significantly reduces memory requirements for each line store in the comb filter. After comb filtering, the original sampling rate is restored to facilitate the combination of the luminance components with the notch filtered luminance signal.

In alternative embodiments, the number of taps or line delays in the comb filter is varied depending on one or more design parameters.

In an alternative embodiment, the signal separation system adopts an adaptive signal weighting scheme to dynamically adjust the portion of the final signal that is derived from a particular filtering scheme. In one configuration, a line difference detector forms a luminance coefficient and a chrominance coefficient depending on the amount of change occurring between video scan lines. The value of the luminance coefficient controls the ratio of notch filter separated luminance signal to comb filter separated luminance signal in the final output of the luminance signal. The value of the chrominance coefficient controls the ratio of band pass filter separated chrominance signal to comb filter separated chrominance signal in the final output of the chrominance signal.

Thus, the adaptive system dynamically selects which type of signal separation method is used at the output based on the detected difference between scan lines on a pixel by pixel basis. The adaptive system increases the percentage of notch and band pass filtered signal in the final output during periods when the signal represents motion or a change in color in the video image. Conversely, the adaptive system increases the percentage of comb filtered signal in the final output during periods when the signal represents reduced motion or consistent color in the video image.

Other features and advantages of the invention, as well as the structure and operation of particular embodiments of the invention, are described in detail below with reference to the accompanying drawings.

BRIEF DESCRIPTION OF THE DRAWINGS

FIG. 7A illustrates a plot of the frequency response of a comb filter configured to separate the luminance components of a composite signal.

FIG. 7B illustrates a plot of the frequency response of a comb filter configured to separate the chrominance components of a composite signal.

DETAILED DESCRIPTION OF THE PREFERRED EMBODIMENTS

1. Background On Comb Filters

The following background on comb filters is provided for the purpose of facilitating understanding of the subject invention. More specifically, it is being provided for purposes of comparing and contrasting with the subject invention although it incorporates some of its features. Since it incorporates some of the features of the subject invention, it is not entitled to prior art effect. Comb filtering is best understood in reference to FIGS. 4 and 5.

To aid in the understanding of comb filters, a brief discussion of quadrature amplitude modulation is first provided. Quadrature amplitude modulation (QAM), based on basic amplitude modulation, is widely adopted for television transmission. However, QAM improves on the performance of basic amplitude modulation. The QAM technique comprises simultaneously transmitting two carrier signals, each of which are at the same frequency, but separated by a 90° phase shift. The mathematical form of the transmitted signal is as follows:

$$S(t)=A \times \mathrm{Sin}\ (Wc \times t)+B \times \mathrm{Cos}\ (Wc \times t)$$

In this equation, A and B represent the amplitude of the two carrier signals.

Figure 4:
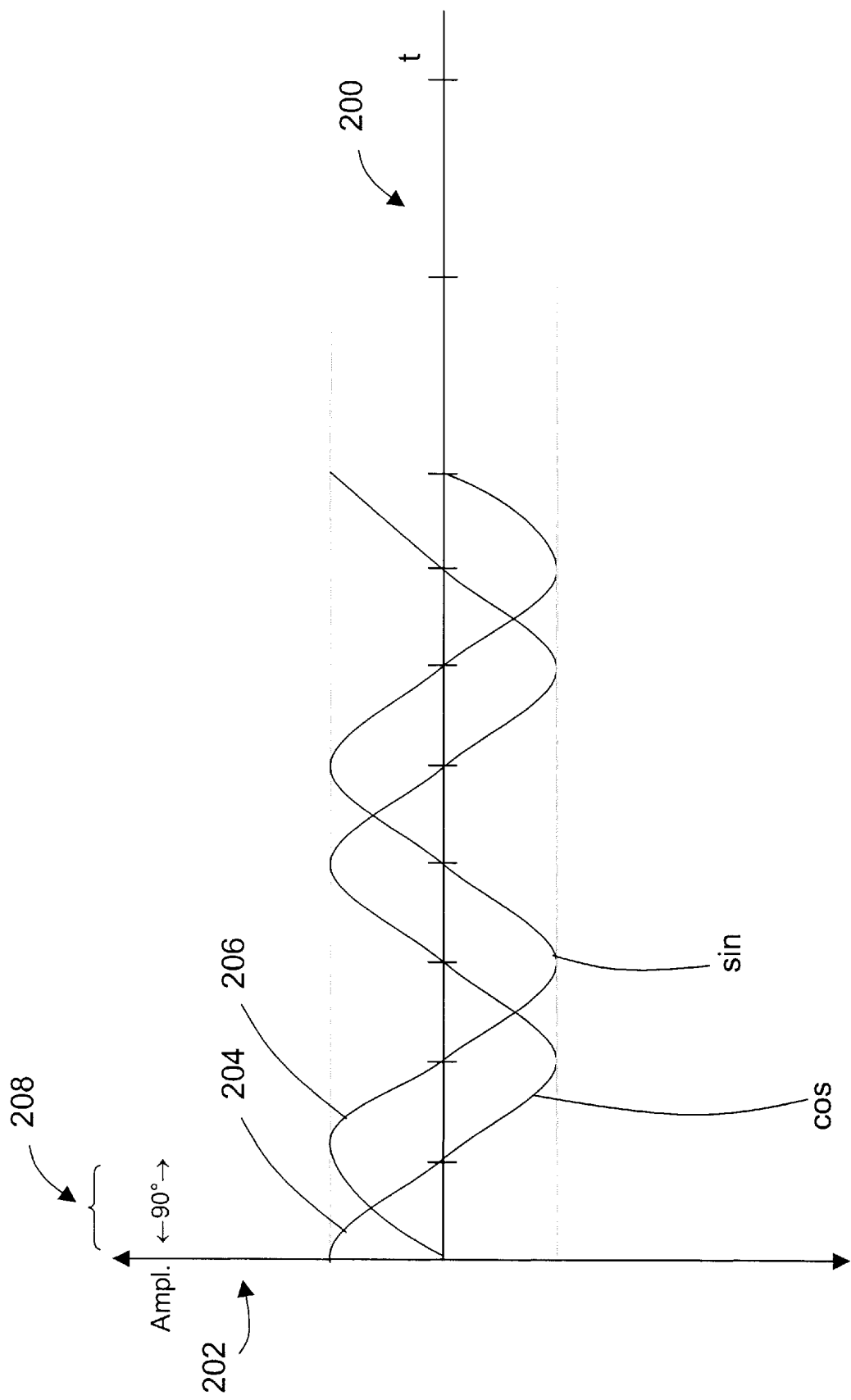
FIG. 4 illustrates a plot of sine and cosine modulation signals in accordance with quadrature amplitude modulation.

FIG. 4 graphically illustrates the relationship between two quadrature signals, A and B, each transmitted with a 90 degree phase separation 208. A horizontal axis 200 represents time and a vertical axis represents amplitude 202. For an NTSC video signal, the I component of the chrominance portion of the composite signal is transmitted on a cosine carrier wave 204, the Q component of the chrominance portion of the composite signal is transmitted on a sine carrier wave 206, and the luminance portion of the composite signal is transmitted directly. The sine and cosine waves are 90 degrees out of phase.

When considered over multiple lines, the luminance frequency components cluster around harmonics of the horizontal line frequency. The subcarrier frequency has been chosen such that the chrominance frequency components cluster around the midpoints between the harmonics of the horizontal line frequency. This has been achieved by selecting a subcarrier frequency that is 227.5 times the horizontal line frequency. Therefore, there are 227.5 subcarrier cycles per line, and the subcarrier phase at each point in one line will be 180 degrees away from the subcarrier phase at that same point in the preceding line and the following line. The advantage of this is further illustrated below in conjunction with a discussion of comb filtering.

Figure 5:
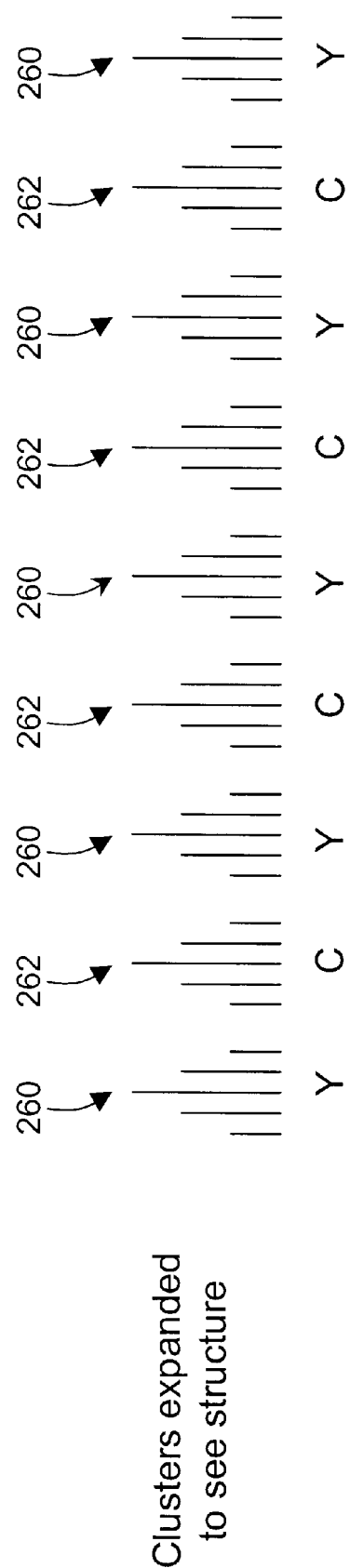
FIG. 5 illustrates a plot of the frequency content of a quadrature amplitude modulated composite video signal.

This is further illustrated in FIG. 5 which represents the frequency content of the luminance and chrominance components of a composite signal to better illustrate the differences in frequency between these signal components. As shown, luminance frequency components 260 are interleaved with the chrominance frequency components 262.

Figure 6:
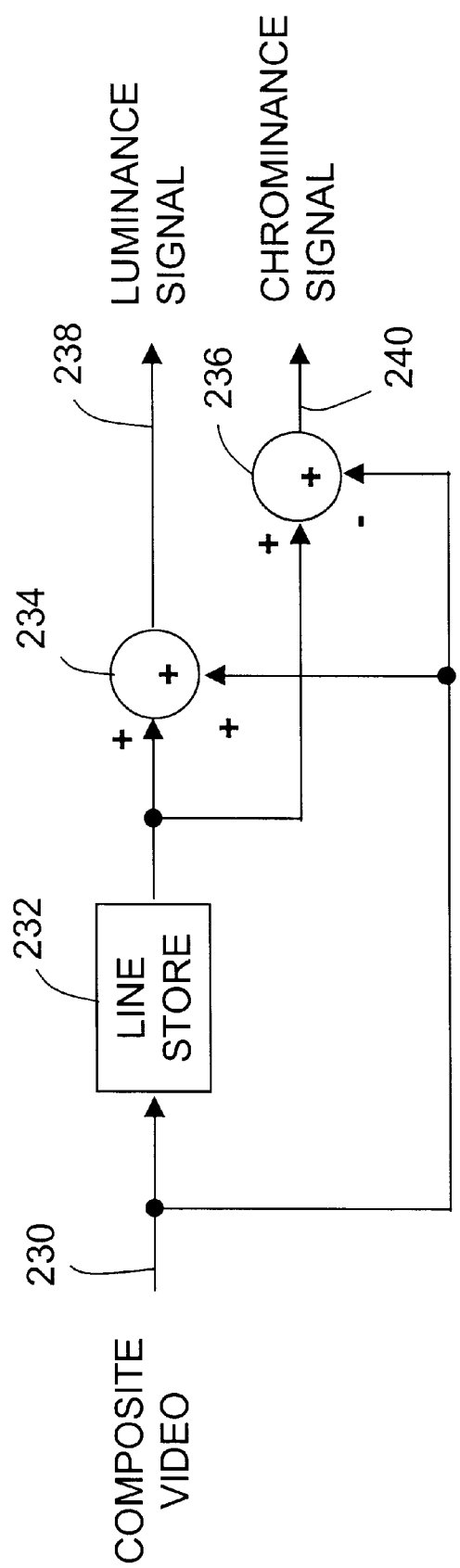
FIG. 6 illustrates a block diagram of a basic comb filter.

FIG. 6 illustrates a basic comb filter. In operation, a composite signal arrives at input 230 and branches into a line store 232, a first summing point 234 and a second summing point 236. The line store delays the incoming composite signal for a time equivalent to the period of one line.

In regions of the video image where the Y, I, and Q components on one line are the same as the previous line, the composite signal for one line is similar to the composite signal for the previous line. However, differences in phase do exist. The luminance portion of the composite signal is the same for both lines, but the chrominance portion of the composite signal for one line is phase shifted by 180 degrees compared to the chrominance portion of the composite signal for the previous line. This occurs because the subcarrier is phase shifted by 180 degrees relative to the previous line. With reference to FIG. 6, these phase differences and the additive and subtractive properties of the feed around loop cause the unwanted portions of the chrominance and luminance signals to cancel. The luminance signal is provided on a line 238 and the chrominance signal provided on a line 240.

Comb filters have a frequency response configured to filter out a particular repeating frequency pattern in signals that are offset in time. The frequency response of a comb filter is illustrated in FIGS. 7A and 7B. The horizontal axis 250 represents frequency and the vertical axis 252 represents filter response in dB. As shown in FIG. 7A, the comb filter frequency response for the luminance portion (Y) of the signal is represented by line 254. Similarly, FIG. 7B illustrates the comb filter frequency response for the chrominance portion (C) of the signal, represented by line 256. In effect, the comb filter acts as a notch filter with a plurality of combs or teeth centered on or aligned with the frequency components of the desired signal.

Because of its configuration, the comb filter excels in situations where the composite signal is stable or consistent from line-to-line such as, for example, in an area of solid color. Undesirably, however, at portions of a signal representing vertical transitions between colors or areas of motion in the video image, the comb filtering technique is undesirable because comb filtering creates artifacts at vertical transitions between differing colors and adjacent to moving objects.

A further drawback of comb filters is that comb filters are sensitive to imperfections in the line-to-line subcarrier phase difference. This sensitivity results from the line store 232 and the summing points 234, 236 in the comb filter. Subcarrier phase differences occur when the phase between the current signal and a line stored signal is other than 180 degrees out of phase. In such a situation, rather than perfectly adding or canceling at the summing points 234, 236, the signals, being out of phase, combine inaccurately and provide inaccurate luminance and chrominance signals.

Yet another drawback of digital comb filters concerns memory requirements. Comb filters include line stores which require memory to store a line of video information. Comb filters may be implemented as 2 tap, 3 tap, 4 tap, etc. comb filters. The more taps, the greater the number of line stores, and the greater number of line stores, the greater the memory requirements for storing a line of memory intensive video information. Excessive memory requirements are undesirable because they increase the cost and size of a video device.

2. Example Environment of the Subject Invention

Figure 1:
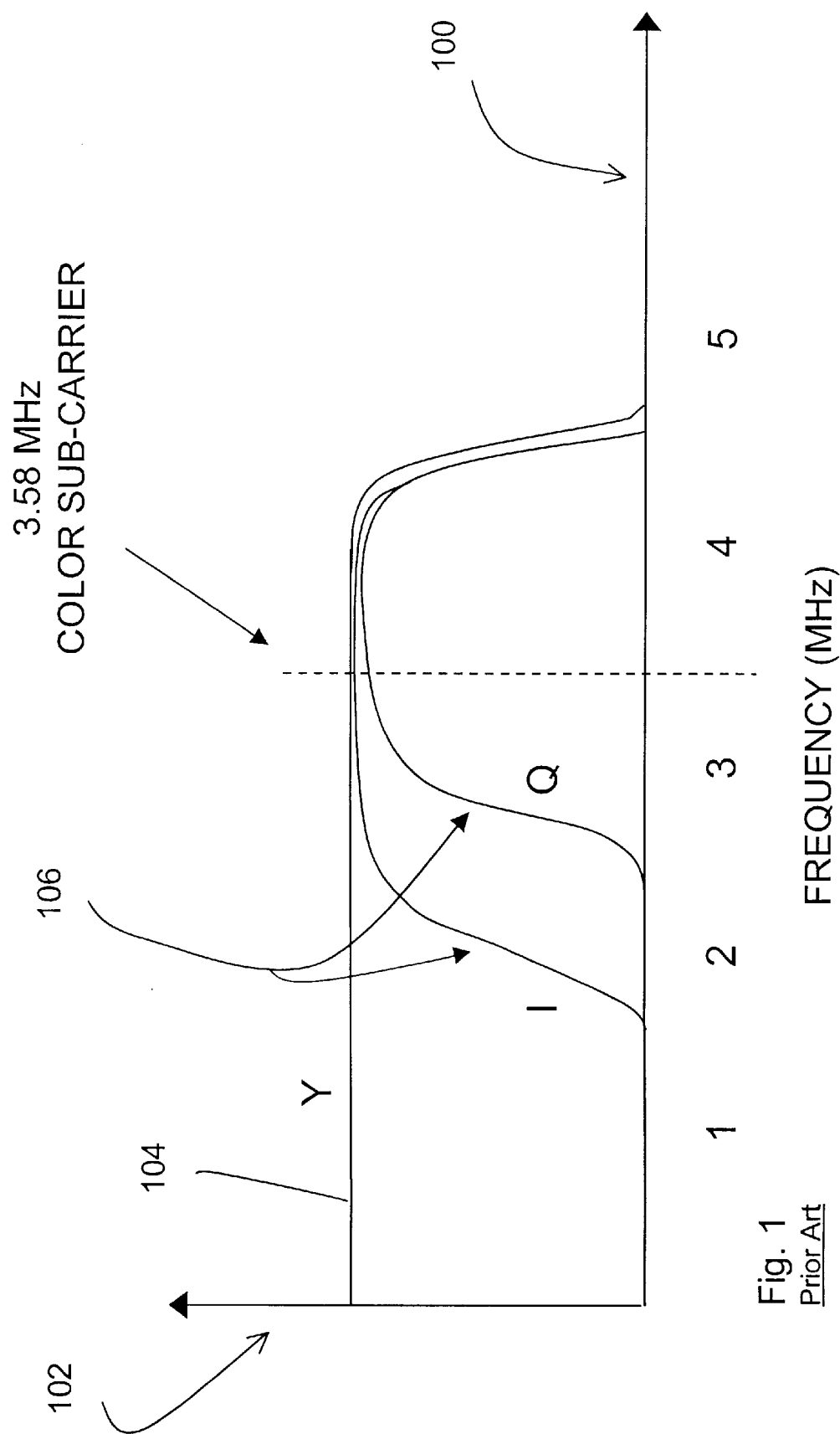
FIG. 1 illustrates a frequency plot of the components of a composite video signal.
Figure 2:
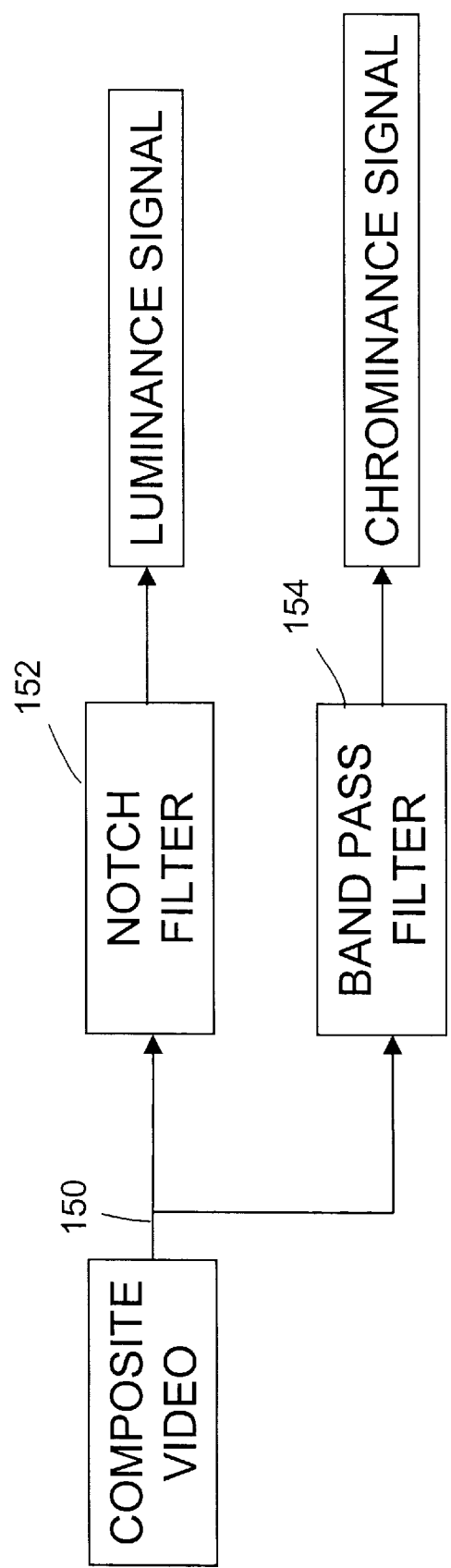
FIG. 2 illustrates a block diagram of a combined notch and band pass filter.
Figure 3:
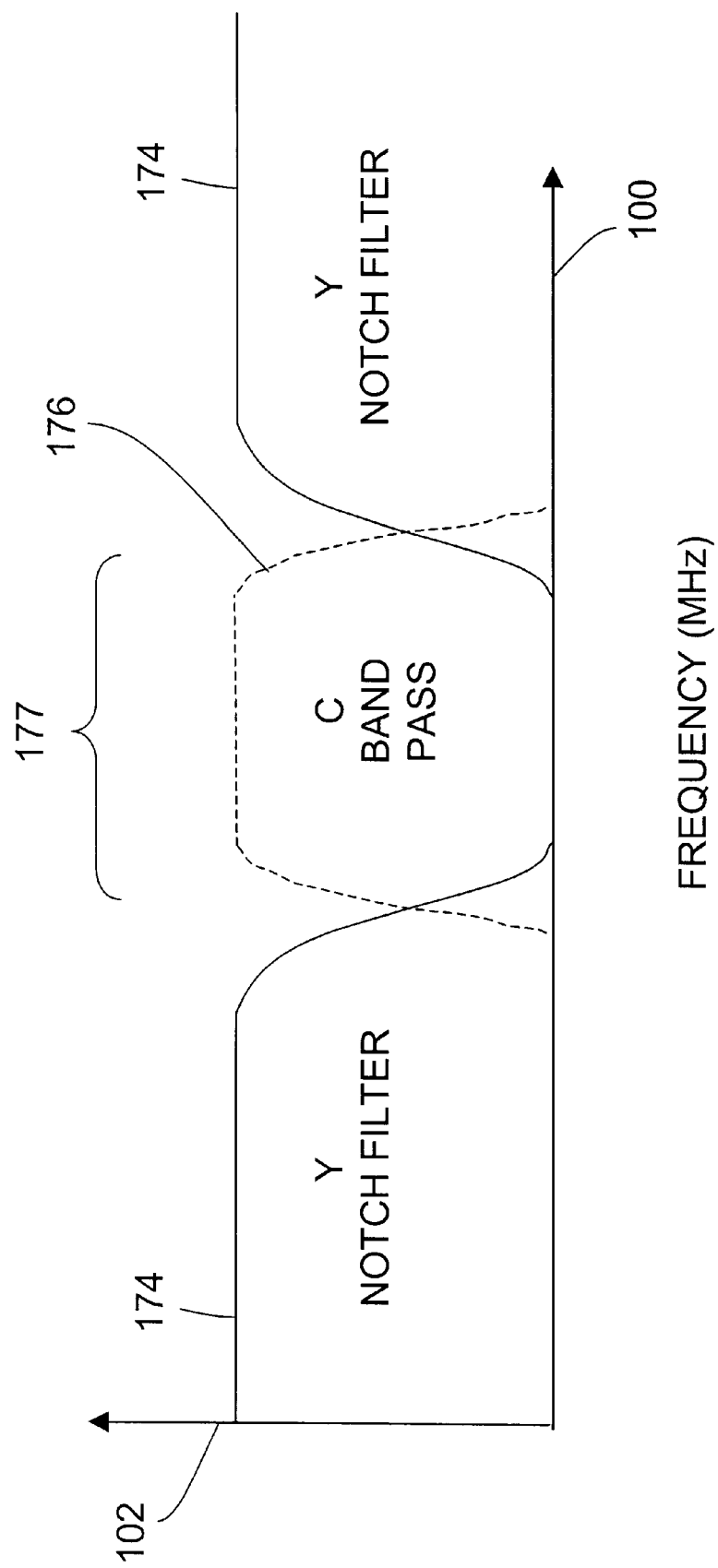
FIG. 3 illustrates a plot of the frequency response of a notch and band pass filter configured to filter a composite video signal.

An example environment of the subject invention is in a video decoder. An example of a situation in which such a video decoder might be beneficially used is in a television receiver configured to receive a composite television signal. In such an environment, the composite signal, shown in FIG. 1, comprises overlapping luminance and chrominance components. Hence, one use of the present invention is in the separation of chrominance and luminance components in a television signal.

Another example environment of the subject invention is in video processing systems for computers. In such an environment, the subject invention separates composite video signals into the appropriate components for use in the video processing and display apparatus of a personal computer. For example, the signal separation system of the present invention, when presented with a composite video signal, separates the luminance and chrominance components so that each component may be encoded into a format compatible with computer video systems, such as an RGB color space.

It is contemplated that numerous other environments exist for the subject invention, including but not limited to all environments in which comb filters are presently in use.

First Example Embodiment

Figure 8:
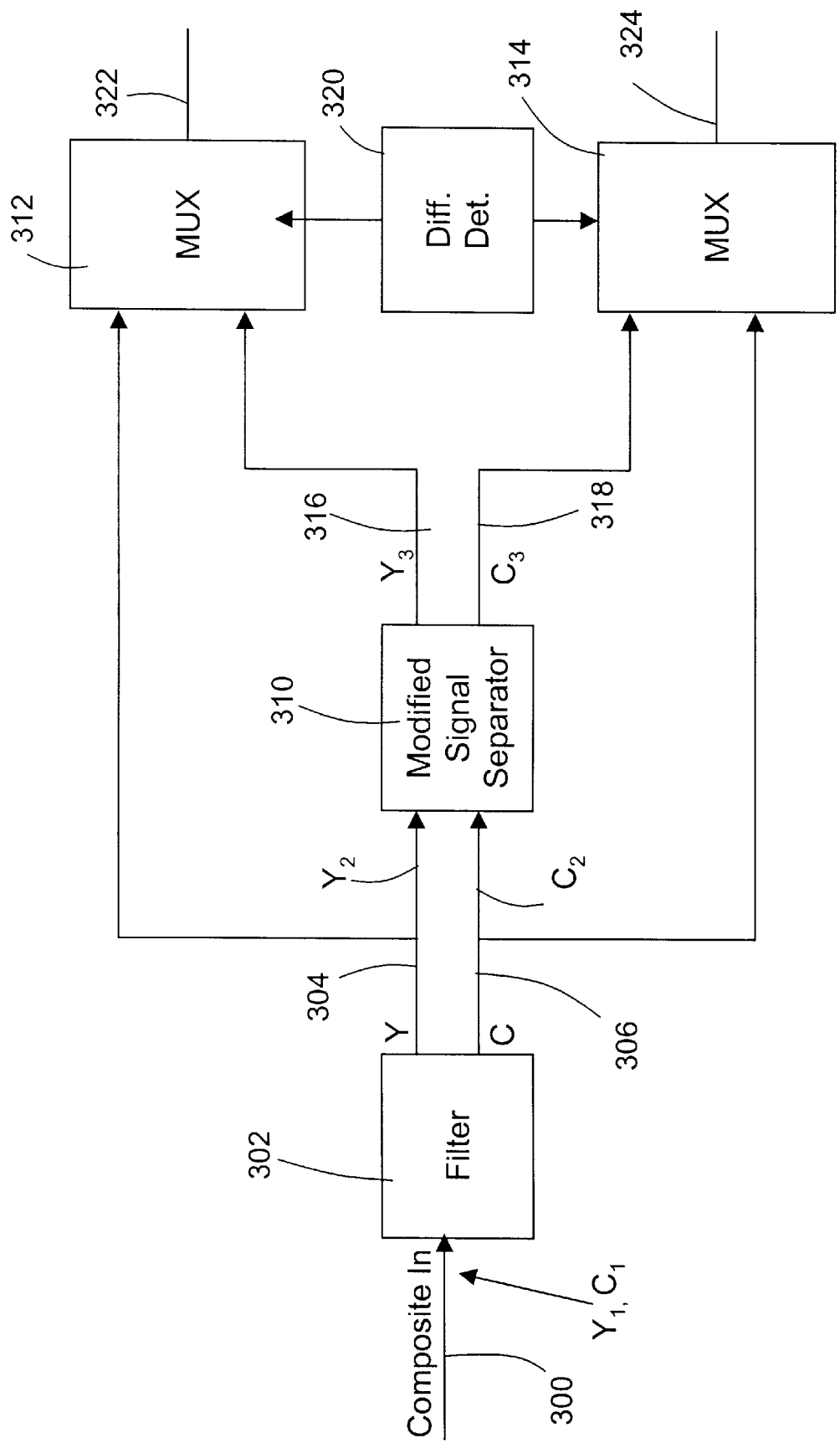
FIG. 8 illustrates a block diagram of an adaptive signal separator of a first embodiment.

FIG. 8 illustrates a first embodiment of the subject invention. As shown, FIG. 8 illustrates a block diagram of an adaptive signal separation circuit. As shown, an input line 300 configured to carry a composite signal connects to a filter or filter system 302. A composite signal is defined to mean a signal having unique overlapping signal components. In this embodiment, the composite signal may comprise any type of composite signal, although for purposes of discussion, reference is made to a composite video signal.

The filter system 302 separates the majority of the two or more overlapping signals that comprise the composite signal. In one configuration, the filter system 302 comprises a notch and band pass type filter.

Two output lines 304, 306 exit the filter system. Output line 304 connects to a modified signal separator 310 and a luminance multiplexer 312. Output line 306 connects to the modified signal separator 310 and a chrominance multiplexer 314. It is contemplated that, if the signal separation circuitry of the subject invention is configured to separate a composite signal comprising more than two signal components, then the circuitry would include an output line 304, 306 and a multiplexer 312, 314 for each component of the composite signal.

The modified signal separator 310 includes two outputs lines 316, 318 connected to the luminance multiplexer 312 and chrominance multiplexer 314 as shown.

A line difference detector 320 connects to the luminance multiplexer 312 and the chrominance multiplexer 314.

Figure 9:
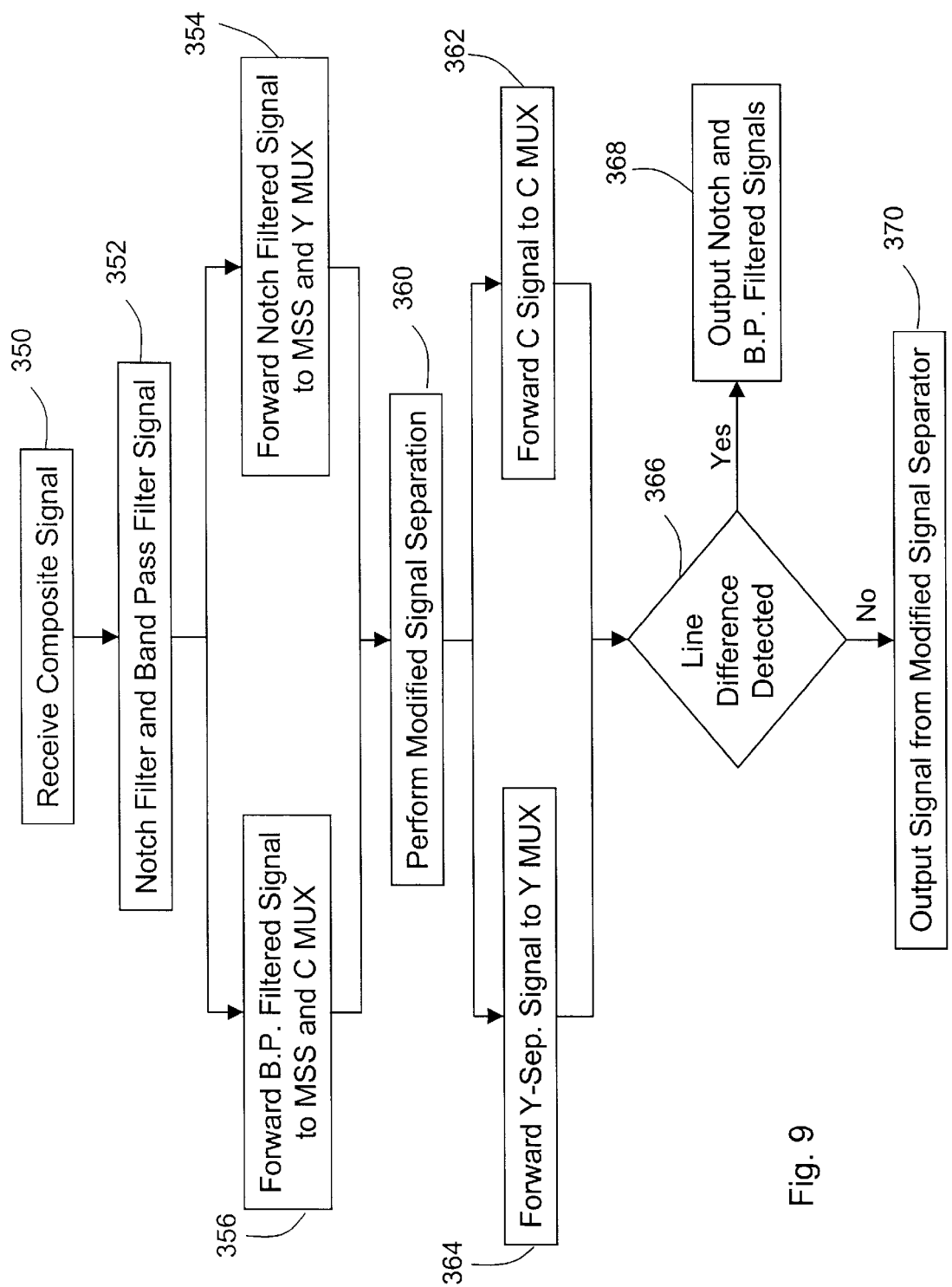
FIG. 9 illustrates an operational flow diagram of one exemplary method of operation of the adaptive signal separator.

The operation of the adaptive signal separation system illustrated in FIG. 8 is preferably discussed in conjunction with the operational flow chart illustrated in FIG. 9. The operation of the adaptive signal separation system shown in FIG. 8 comprises first receiving a composite signal at step 350. As can be appreciated, the signal arriving at input line 300 comprises some form of composite or combined signal containing signal components that must be separated.

Moving to step 352, the signal enters the filter system 302. The filter system 302 in this first embodiment comprises a notch filter and a band pass filter. These types of filters are known by those of skill in the art and accordingly need not be discussed in detail herein. Basically, in one embodiment, the notch filter separates the majority of the luminance signal from the composite signal although a portion of the luminance information is missing, while the band pass filter separates all or substantially all of the chrominance signal, although the luminance information missing from the luminance signal is riding on or otherwise associated with the chrominance signal.

Next, at step 356, the chrominance (C) component is output on the output line 306. As shown, the band pass filtered signal is provided to the modified signal separator 310 (MSS) and the chrominance multiplexer 314.

Simultaneously or at least generally concurrently, at step 354, the luminance signal is provided to the modified signal separator 310 and the luminance multiplexer 312.

Thereafter, at step 360, the modified signal separator 310 performs modified comb filtering in accordance with the subject invention as is discussed below in conjunction with FIG. 16. For purposes of the present discussion, the modified signal separator 310 outputs a comb filtered luminance signal ($Y_3$) and a comb filtered chrominance signal ($C_3$). In one embodiment, the comb filtered luminance signal ($Y_3$) and the comb filtered chrominance signal ($C_3$) comprise the complete versions of each signal.

Next, in one embodiment, at step 364, the operation outputs the separated luminance signal ($Y_3$) to the luminance multiplexer 312 on a line 316 simultaneously or at least generally concurrently with, at step 362, forwarding the chrominance signal ($C_3$) to the chrominance multiplexer 314. The operation of the modified signal separator 310 is discussed in greater detail in conjunction with FIG. 13.

Thereafter, the operation progresses to step 366, wherein the line difference detector 320 compares on a pixel by pixel basis the incoming video signal with a time delayed version for differences.

If the line difference detector 320 detects a line-to-line difference, the operation progresses to step 368 and each of the luminance multiplexer 312 and the chrominance multiplexer 314 is directed to output the respective signals generated by the notch and band pass filters. For example, if the color assignment as detected between pixels is changing, or if there is a change in rumination between pixels, then the preferred signal separation technique is notch and band pass filtering.

Alternatively, if at step 366, the line difference detector 320 does not detect a difference between the current pixel and the time delayed pixel of the previous line, or the size of the difference is below a threshold level, the operation progresses to a step 370 wherein the difference detector 320 instructs each of the luminance multiplexer 312 and chrominance multiplexer 314 to output the respective signals from the modified signal separator 310. Thus, if the color assignment as detected between pixels is not changing and if there is no change in rumination between pixels, or if the size of the difference is below a threshold level, then the preferred signal separation technique is comb filtering.

In summary, when the line difference detector 320 determines a substantial change in pixel values in a line to line comparison, then it instructs the multiplexers 312, 314 to output on lines 322, 324 the output of the filter system 302. Conversely, if the line difference detector 320 determines no change in pixel value in a line to line comparison, or if the size of the change is below a threshold level, it instructs the multiplexers 312, 314 to output on lines 322, 324 the output of the modified signal separator 310.

Figure 10:
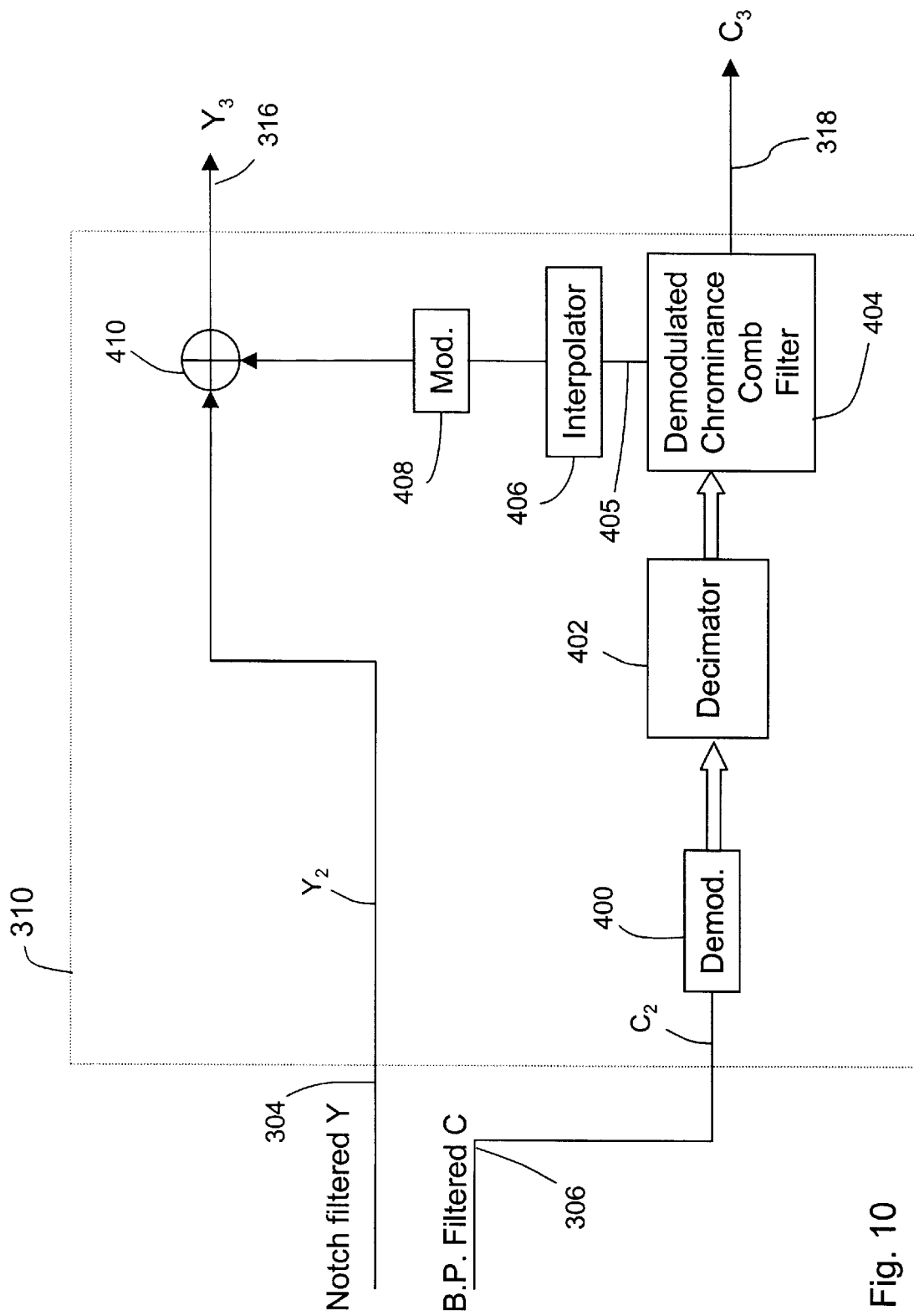
FIG. 10 illustrates a block diagram of the modified signal separator in accordance with the first embodiment.

FIG. 10 illustrates a detailed block diagram of the modified signal separator 310. In relation to FIG. 8, like elements in FIG. 10 are numbered with like reference numerals. The modified signal separator 310 receives a notch filtered luminance (Y) input 304 and a band pass filtered chrominance (C) input 306. In one embodiment, the inputs 304, 306 are modulated. In the case of a composite television or a video signal, the information is generally imposed on a subcarrier signal to facilitate transmission. The notch filtered Y input 304 is coupled to a summer unit 410, the function of which will be discussed in greater detail below.

The band pass filtered chrominance input 306 is coupled to a chrominance demodulator 400. As known by those of ordinary skill in the art, the demodulator 400 reverses the effect of modulation, thereby eliminating the controlled frequency variation and phase and/or amplitude variation of a carrier wave.

Figure 11:
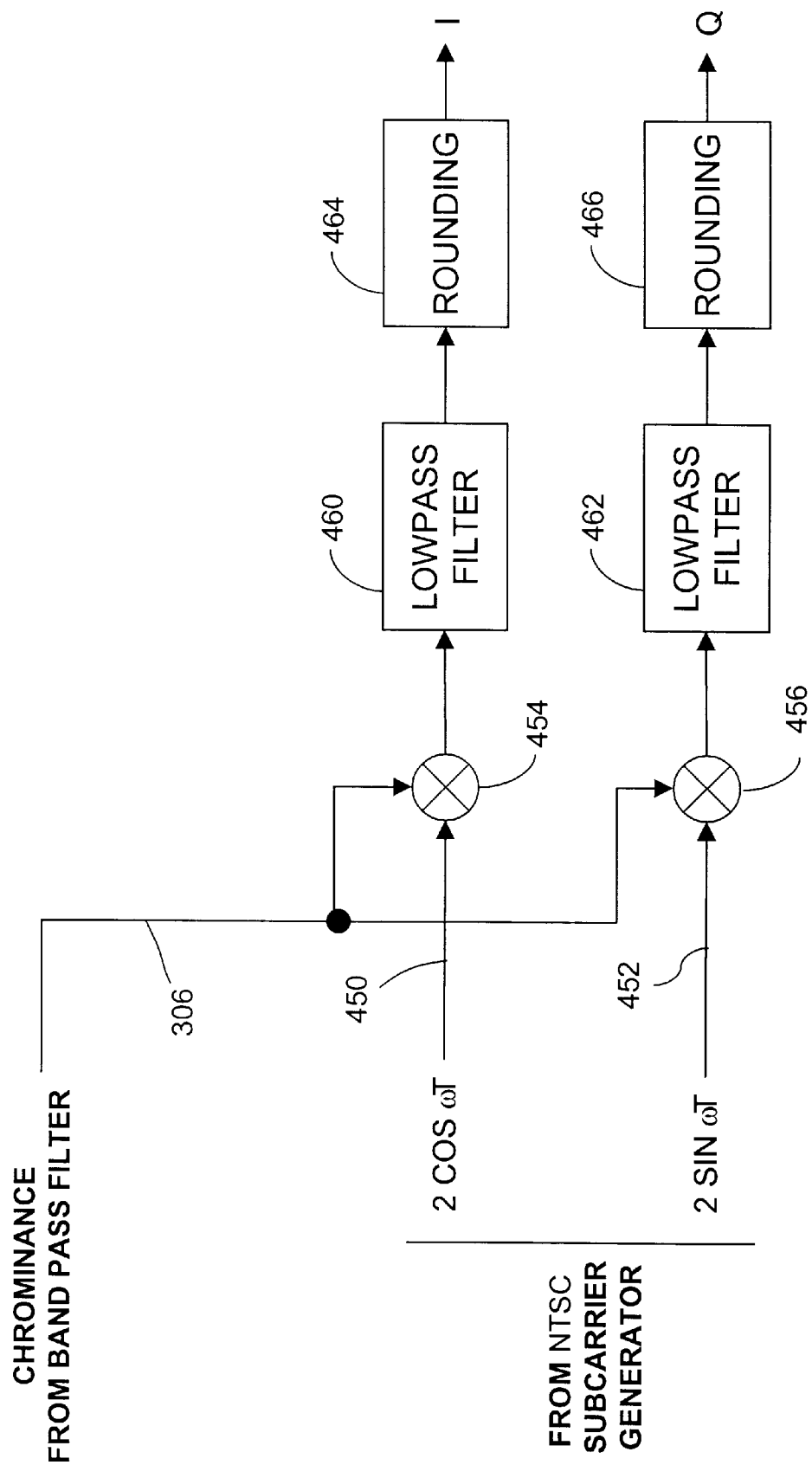
FIG. 11 illustrates a block diagram of a chrominance demodulator.

FIG. 11 illustrates an example of a chrominance demodulator. The demodulator comprises an input line 306 coupled to the demodulation circuitry. For NTSC composite video, the incoming chrominance signal is multiplied by 2 cosine wT, which is supplied by cosine input in multiplier 454 for the I component of the chrominance signal. Likewise, the chrominance input is multiplied at multiplier 456 by 2 sine wT, which is supplied by a sine input 452, for the Q component of the chrominance signal.

The incoming chrominance signal is multiplied by the cosine and sine signals arriving from the subcarrier generator because an NTSC chrominance signal is represented by $$C = Q \sin wT + I \cos WT$$

where $w=2\pi f_{SC}$, $f_{SC}=3.579545$ MHz, and $f_{SC}$ represents the carrier frequency. This yields the demodulated format of the I and Q signals.

Next, as shown by the following equations, the two times subcarrier frequency components (2wT) are removed by low pass filtering resulting in the I and Q signals being recovered.

$$(Q \sin wT + I \cos WT) \times (2 \sin WT) = Q - Q \cos 2WT + I \sin 2WT$$

and $$(Q \sin wT + I \cos WT) \times (2 \cos WT) = I + I \cos 2WT + Q \sin 2WT$$

In one NTSC example, I has a range of 02±78 and Q has a range of 02±68. In another configuration, the multipliers 454, 456 have saturation logic to ensure that overflow and underflow conditions are saturated to the maximum and minimum values respectively.

Each multiplier 454, 456 connects to a low pass filter 460, 462. The I and Q signals undergo low pass filtering to remove two times subcarrier frequency components ($2f_{SC}$), i.e., the 2wT components. Thereafter, in one implementation, the output of the low pass filters 460, 462 are rounded by rounding mechanisms 464, 466 to a minimum of 8 bits plus a sign bit to conserve processing resources in subsequent aspects of the digital receiver. After demodulation, the chrominance signal is composed of two components, I and Q, or transformations of these two components, e.g. U and V, or Cr and Cb, both of which are discussed below.

It is fully contemplated that the principles of the subject invention are applicable to other video standards beyond basic NTSC including but not limited to NTSC (M), NTSC (4.43), NTSC without 7.51RE pedestal, and PAL (B, D, G, H, M, N and N combination).

With this basic understanding of a chrominance demodulator as shown in FIG. 11, the discussion of FIG. 10 is continued. With reference to FIG. 10, the output of the demodulator 400 is coupled to a decimator 402. A decimator 402 is a video processing device that reduces the amount of digital information that represents an image.

Figure 12B:
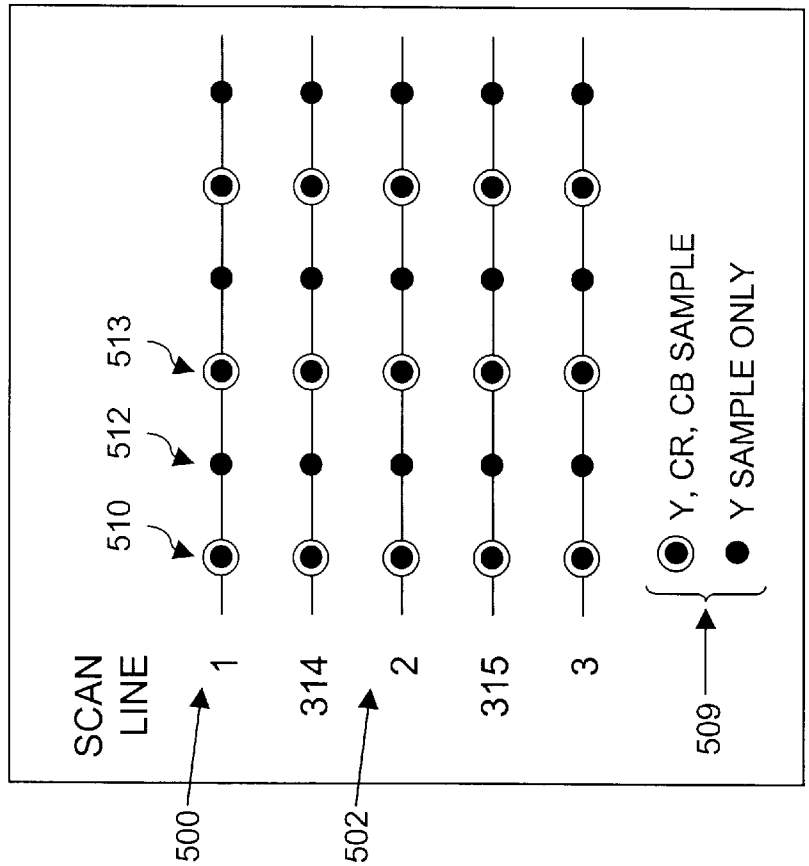
FIG. 12B illustrates the position of unique data samples in a 4:2:2 format signal.
Figure 12A:
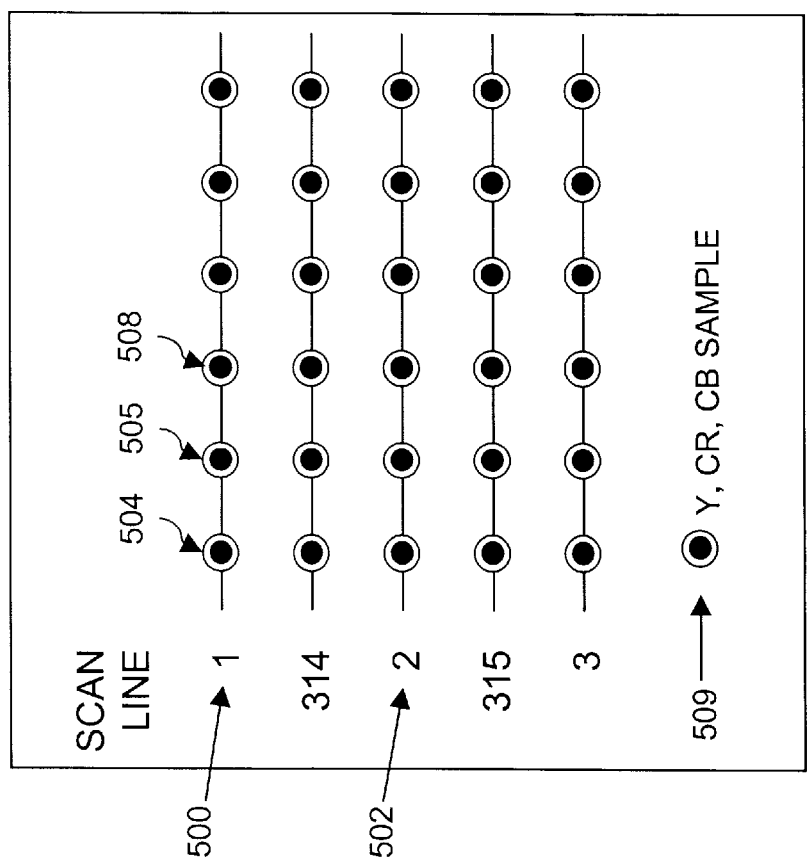
FIG. 12A illustrates the position of unique data samples in a 4:4:4 format signal.

FIGS. 12A and 12B illustrates the effect of decimation on a video image in relation to the storage requirements for the image. As is known in the art, two common video formats are the 4:4:4 YCrCb format and the 4:2:2 YCrCb format. The Cr and Cb format is simply a different color space representation of the chrominance signal and, while not the focus of the present discussion, is briefly discussed for purposes of understanding.

Color space is a term common to video processing and simply denotes a mathematical representation for a color. Television decoders utilize the mathematical color representation to generate the various colors in the displayed image. The YCrCb color space is the color space defined by Recommendation ITU-R BT.601. In comparison, U-V color space is the mathematical format used to define color in the NTSC standard. The Cr and Cb components are color difference signals that, when presented together, represent a color. These values can be thought of as scaled versions of U and V in the YUV color space.

Relevant to the present discussion is the difference between the 4:4:4 format and the 4:2:2 format. These format representations indicate the number of samples that represent four video pixels. By way of example, if a format is denoted as X:Y:Z, the X position represents the number of data samples that represent the luminance information for four pixels. Likewise, the Y position represents the number of data samples that represent four pixels of Cr data while the Z position represents the number of samples that represent four pixels of the Cb data.

Thus, in a 4:4:4 format, for every four Y samples there exist four Cr samples and four Cb samples. Each pixel is represented by an independent Y, a Cr, and a Cb value. This is illustrated in FIG. 12A. A portion of the display comprising a first line 500 and a second line 502 is shown. The first line 500 includes pixels 504, 505 and 508. As shown by key 509 and in accordance with the 4:4:4 format, each pixel is represented by an eight bit Y sample value, an eight bit Cr sample value and an eight bit Cb sample value.

Conversely, in a 4:2:2 format, for every four Y samples there are two Cr samples and two Cb samples. Thus, the 4:2:2 advantageously reduces the memory requirements needed to store the data representing an image. The 4:2:2 format is illustrated in FIG. 12B where, in relation to FIG. 12A, like elements are referenced with like reference numerals. As shown, and with reference to the key 509, an independent sample value for each of Y, Cr and Cb represent the pixel 510. However, pixel 512 only has an independent sample value for the luminance component (Y). The Cr and Cb sample values must be derived from other Cr and Cb values in the image data. This pattern repeats as shown in all the lines in the display. In one configuration, the sample values for Cr and Cb for pixel 512 are obtained using interpolation between the corresponding values of pixels 510 and 513.

With reference to FIG. 10, in one embodiment, decimator 402 reduces a video signal in a 4:4:4 format to a 4:2:2 format. As can readily be understood from the forgoing discussion, altering the format of a video signal to a 4:2:2 format from a 4:4:4 format significantly reduces the amount of memory required to store a digitized image.

Although discussed in terms of decimation from 4:4:4 format to 4:2:2 format, other types of signal manipulation may be undertaken to reduce the storage requirements. One example of a different signal manipulation is reduction to a 4:1:1 format. Another method of reducing the memory requirements is to reduce the number of bits utilized to represent each of the Y, Cr and Cb values, such as from 8 bits per sample to 7, 6, 5, or 4 bits.

Decimation to a 4:2:2 format is performed in several ways. One method is to simply discard the unwanted samples. However, this method may introduce image artifacts in the video signal. An alternative method is to use a decimation filter which reduces artifacts to an acceptable level by smoothing in areas of the image containing fine or detailed image information or by smoothing in areas of the signal that represent movement in the image. Decimation filters provide excellent results in areas where the color information is unchanging from one sample to the next.

With reference to FIG. 10, the output of the decimator 402 is coupled to a comb filter 404. Comb filters will be discussed in greater detail in conjunction with FIG. 16.

Comb filters take advantage of the difference in phase shift from one line to the next line in the chrominance signal versus that in the luminance signal to remove unwanted portions of the luminance information from the chrominance signal. The subcarrier frequency has been selected such that its phase shifts by 180 degrees from one line to the next line. When this subcarrier is used to modulate the I and Q components, it produces a chrominance signal that is 180 degrees phase shifted from one line to the next line, assuming the I and Q components are the same for the two lines. This modulated chrominance signal is combined with the luminance signal, which is not modulated and has no phase shift from one line to the next line, to produce the composite signal. During the decoding process, the band pass filtered data, which contains chrominance and luminance components, is demodulated, and the line to line phase shift is eliminated from the chrominance components, but introduced into the luminance components. It is this difference in phase shift characteristics that enables comb filters to be used to improve Y/C separation. The operation of the comb filter is discussed in great detail in conjunction with FIGS. 17 through 18.

The comb filter 404 includes two outputs. The first output comprises a combed chrominance signal on signal line 318. In one implementation, the chrominance signal $C_3$ on line 318 contains only chrominance information because the comb filter removes or at least substantially removes the luminance components in accordance with the principles of comb filters, discussed in great detail below.

The second output of the comb filter 404 on signal line 405 connects to an interpolator 406. The signal on line 405 contains the luminance components missing from signal $Y_2$ on line 304, and combed from the chrominance signal $C_2$. As will be seen, in accordance with the subject invention, the combed luminance components on line 405 are eventually combined with the luminance signal $Y_2$ on line 304.

The output of the comb filter 404 is coupled to an interpolator 406. As known by those of skill in the art, the interpolator 406 reverses, or at least substantially reverses, the effects of the decimator 402, thereby restoring the video signal to a 4:4:4 format. The interpolation averages adjacent pixel sample values to restore the information that was discarded or filtered by the decimator 402. Interpolation to a 4:4:4 format is necessary so that the luminance components may be accurately restored to the luminance signal.

The output of the interpolator 406 is coupled to a modulator 408. The modulator 408 reverses or at least substantially reverses the effects of the demodulator 400 thereby modulating the combed luminance components to the subcarrier frequency. In the case of NTSC video, the luminance component riding on the chrominance signal was originally centered at 3.58 MHz. However, the demodulator 400 removed or at least substantially removed the effect of the 3.58 MHz sub-carrier. Thus, to properly re-combine the comb filtered luminance information, the signal is re-modulated to 3.58 MHz. Modulation techniques for video signals are known by those of ordinary skill in the art and accordingly are not discussed in great detail herein. However it should be noted that the proper phase relationship and timing with the sub-carrier is maintained to ensure proper synchronization.

The output of the modulator 408 is coupled to summing point 410, which is configured to add the signal arriving from the modulator 408 to the notch filtered luminance signal $(Y_2)$ arriving over line 304. The summing point 410 provides an output $(Y_3)$ on a line 316 that represents the total luminance signal. The signal $Y_3$ is the complete luminance signal.

Figure 13:
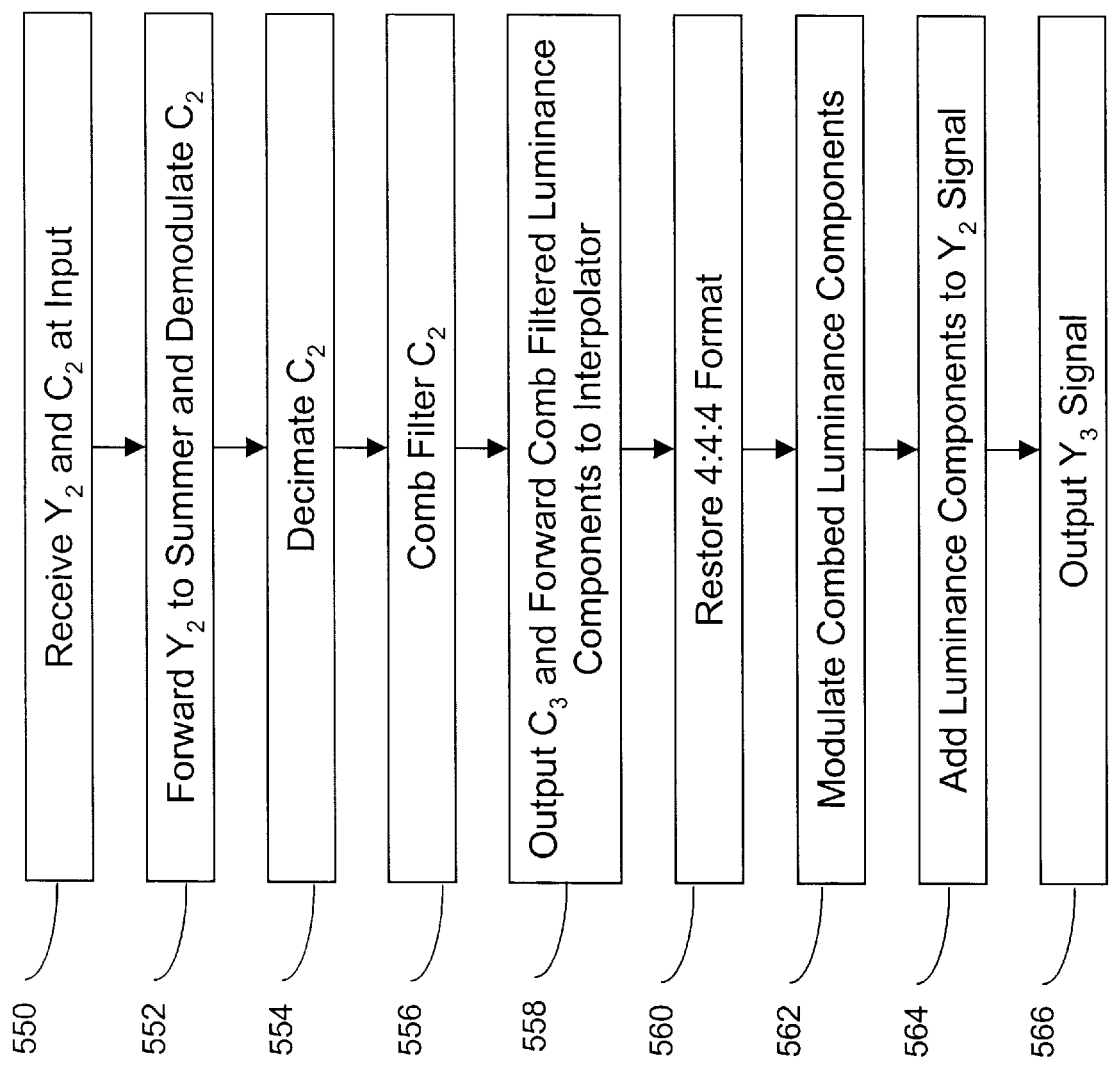
FIG. 13 illustrates an operational flow diagram of one exemplary method of operation of the modified signal separator of the first embodiment.

FIG. 13 illustrates an operational flow diagram of the modified signal separator as illustrated in FIG. 10. At step 550, the modified signal separator 310 receives at its inputs 304, 306 the notch filtered luminance signal, denoted $Y_2$, and the band pass filter chrominance signal, denoted $C_2$.

Next, at step 552, the luminance value is forwarded to a summing point 410 and the chrominance value is forwarded to the demodulator 400. The operation of the summing point 410 is discussed in more detail below.

The demodulator 400 eliminates, or at least substantially eliminates, the carrier signal from the incoming chrominance information, thereby restoring information to a demodulated state.

Thereafter, at step 554, the demodulated chrominance signal enters the decimator 402. The decimator 402 operates to reduce the number of bits utilized to store the chrominance signal. In this embodiment, the decimator 402 modifies the chrominance signal from a 4:4:4 format to a 4:2:2 format. Reducing the storage requirements to a 4:2:2 format reduces the memory required to store the information for each line of video information. For example, in a 4:4:4 format, 24 bits are required to store the information for each pixel. Thus, the storage requirements for four pixels equates to 4×24 bits=96 bits. Consequently, memory space to store 96 bits is required to store 4 pixels of video in a 4:4:4 format.

Conversely, in a 4:2:2 format, every four pixels of video is comprised of four luminance samples and two chrominance samples. Accordingly, to store four pixels of video in a 4:2:2 format, 32 bits of luminance information is stored (4 luminance samples×8 bits each), 32 bits of chrominance information (2 Cr samples×8 bits each), and (2 Cb samples×8 bits each) is stored. This equates to 64 bits of memory space required to store the chrominance information and luminance information in a 4:2:2 format. The advantages of reducing the storage requirements for the video information will become apparent in the following discussion for comb filters.

Next, at step 556, the operation forwards the 4:2:2 format chrominance information to the comb filter 404. The comb filter utilizes line stores in combination with summing points to manipulate the chrominance signal to isolate or at least substantially isolate the luminance components from the chrominance signal. Upon isolation, these luminance components are subtracted from the chrominance signal to provide the combed chrominance signal $(C_3)$ that does not contain unwanted luminance components.

Next, at step 558, the operation forwards the comb filtered luminance components to an interpolator 406. Thereafter, at step 560, the interpolator restores the format of the comb filtered luminance components to a 4:4:4 format. It is necessary to restore the format of the comb filtered luminance components, such as those on line 405 in FIG. 10, to the format of the notch filtered luminance signal $(Y_2)$ prior to combination.

After conversion to 4:4:4 format, the operation progresses to step 562, wherein the modulator 408 re-modulates the combed luminance components to the subcarrier frequency so that the combed luminance components are at the proper frequency. For NTSC, the 3.58 MHz subcarrier frequency is added to the frequency of the luminance components.

Next, at step 564, the operation combines the comb filtered luminance components with the luminance signal $(Y_2)$ in summing point 410. This process restores the luminance components that were removed from the composite signal by the notch filter to provide a restored or complete luminance signal. The restored luminance signal is denoted $Y_3$.

At step 566, the operation outputs the complete luminance signal $(Y_3)$ on a line 316. This completes the operational process of the modified comb filter.

Advantages Of Subject Invention

The subject invention's method of signal separation possesses several advantages. First, a signal separation system configured in accordance with the subject invention more accurately separates the signals by more completely recreating the luminance signal. Systems operating in accordance with one embodiment of the subject invention restore or at least substantially restore the comb filtered luminance components that are missing from the notch filtered luminance signal $(Y_2)$.

Second, as discussed above, reducing the format of the signal prior to comb filtering reduces the memory requirements of each line store in the comb filter. In comb filters having greater than one line store, memory requirements are further reduced.

Third, systems that operate in accordance with the subject invention and that demodulate the signal prior to comb filtering significantly reduce distortion arising from line-to-line subcarrier phase differences.

Figure 14:
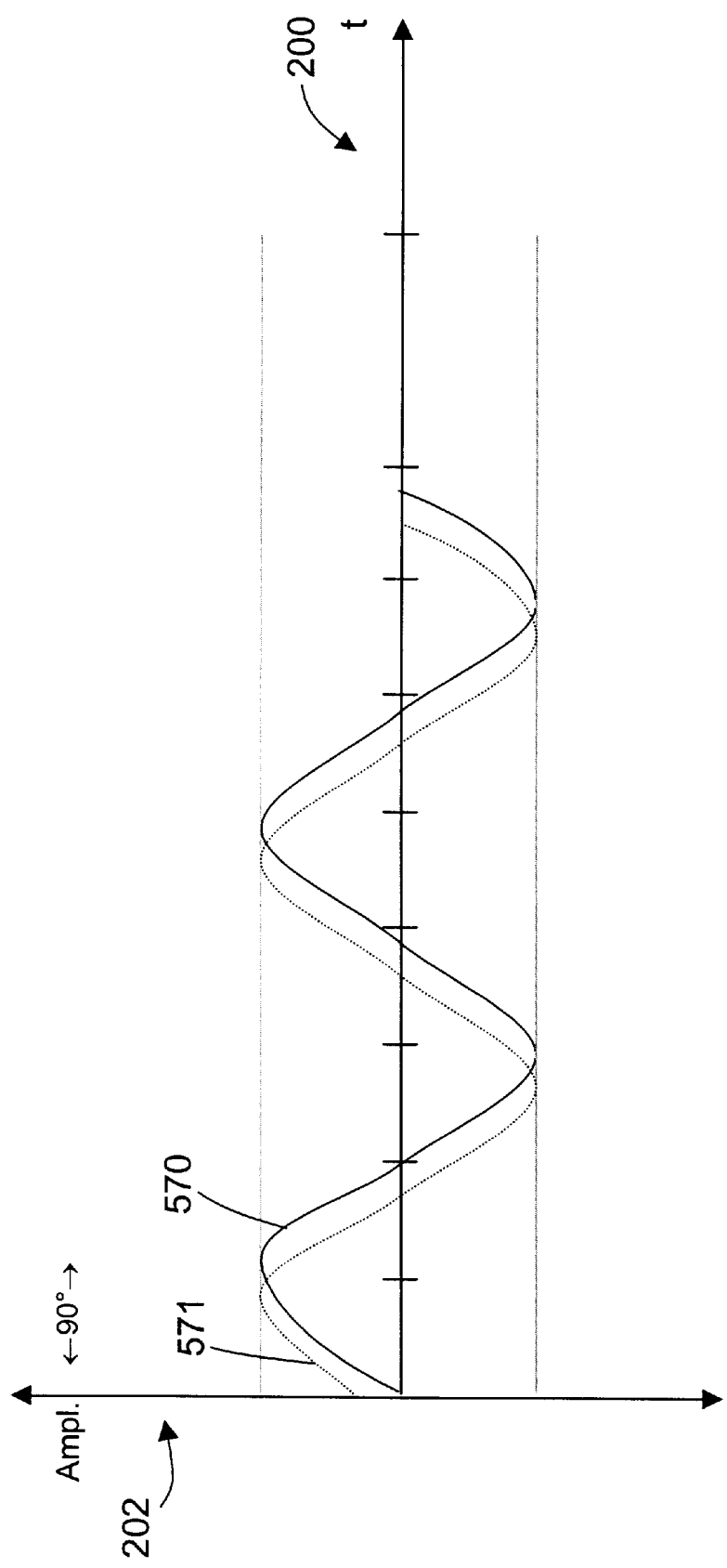
FIG. 14 illustrates a plot of two signals suffering from line to line subcarrier phase differences.

Line-to-line subcarrier phase differences are best explained with reference to FIG. 14, which illustrates a plot of two band pass filtered signals that are in a modulated state, one of which is suffering from line-to-line subcarrier phase differences. An in-phase signal 570 is not suffering from line-to-line subcarrier phase distortion and as such has a zero value as it crosses the horizontal axis. Also shown is an out-of-phase signal 571 that is offset from the in-phase signal 570. When the in-phase signal 570 is delayed by the line store in a comb filter and combined with non-delayed out-of-phase signal 571, the two signals do not completely cancel due to the phase differences. This leads to distortion and artifacts in the video image. This is a problem with systems that do not adopt the principles of the subject invention.

Systems operating in accordance with the subject invention demodulate the chrominance signal prior to comb filtering. Demodulating the chrominance signal eliminates the subcarrier modulation from the chrominance signal. By eliminating the subcarrier, the line-to-line phase differences are advantageously also eliminated from the chrominance information. Thus, the subject invention overcomes the problems of distortion caused by subcarrier line-to-line phase differences.

Data Decoder for Second, Third and Fourth Embodiments

Figure 15:
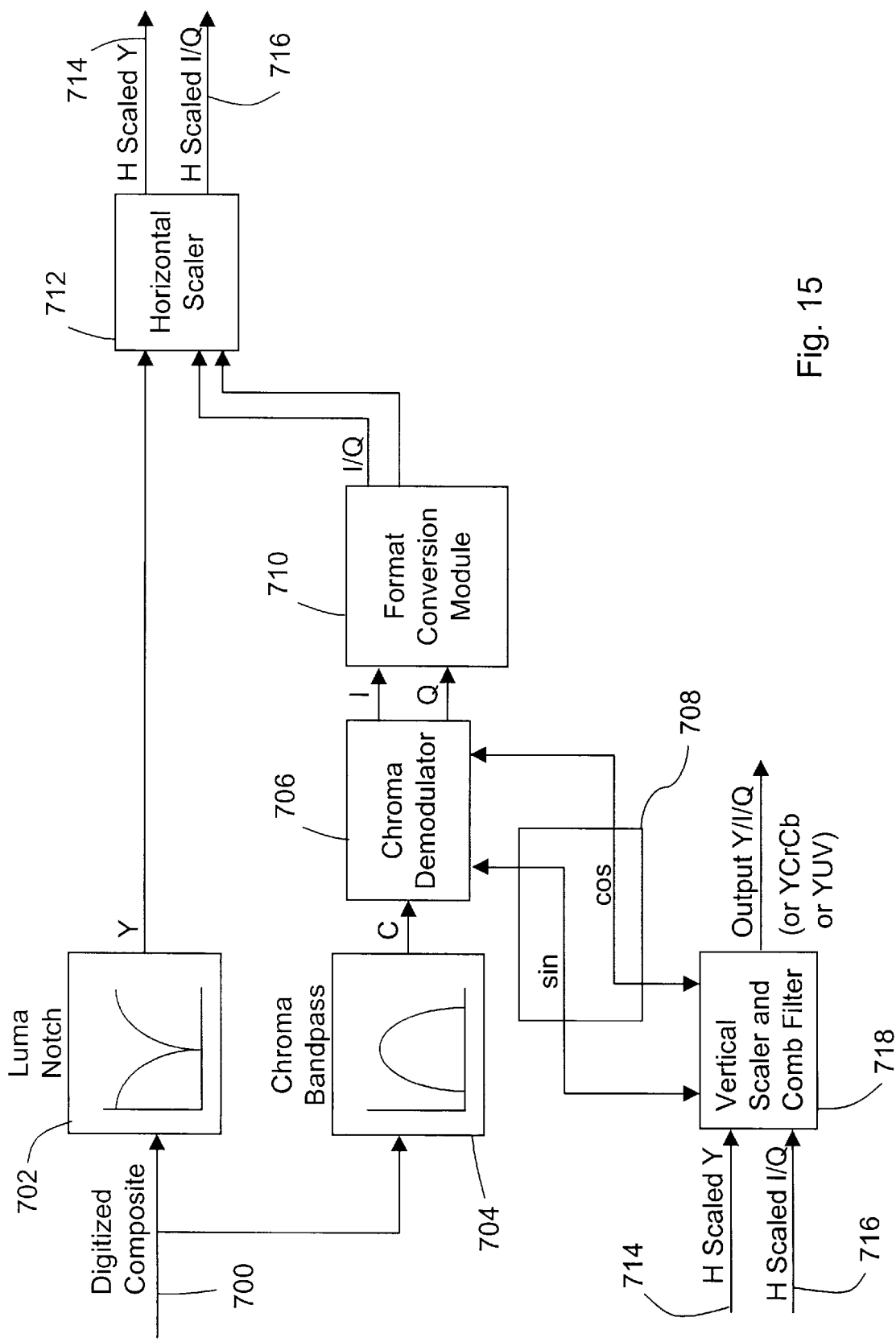
FIG. 15 illustrates a block diagram of a data decoder for use in conjunction with the second, third and fourth embodiments of the subject invention.

FIG. 15 illustrates one configuration of a video data decoder path as found in video decoders adopting the signal separation techniques of the subject invention. This decoder is provided by way of example only and the scope of the subject invention is not limited to the configuration shown. The data decoder provides the supporting circuitry to facilitate video signal separation in accordance with the subject invention. For purposes of discussion, the data decoder shown in FIG. 15 is configured for operation with signals following the NTSC standard. It is contemplated that the principles of the present invention could be applied to other video formats including but not limited to PAL and SECAM.

Figure 23:
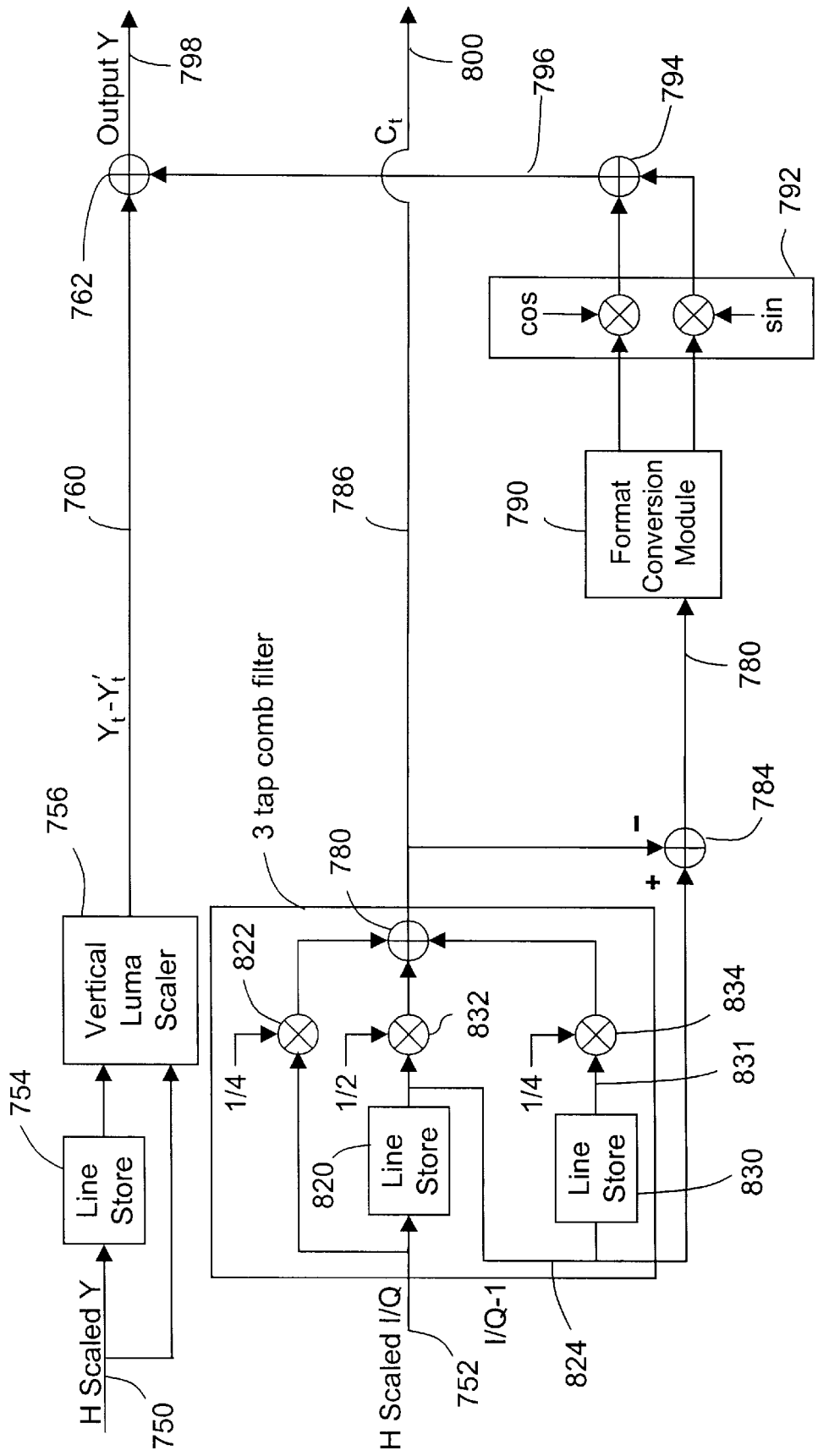
FIG. 23 illustrates a block diagram of a vertical scaler and three tap comb filter configured in accordance with the third embodiment of the subject invention.

FIG. 23 illustrates a third example embodiment, including the componentry and configuration for the block labeled vertical scaler and comb filter. This embodiment interfaces with the hardware of the data decoder shown in FIG. 15.

With reference to FIG. 15, a digitized composite video signal is provided over line 700 to a notch filter 702 and band pass filter 704.

When configured for NTSC standard signals, the design of the notch filter 702 removes or at least substantially removes signal components having a frequency between 2.5 to 4.5 MHz. For an NTSC signal, the signal portion which is allowed to pass through the notch filter 702 contains luminance information. Undesirably, however, as previously discussed, the notch filter also removes portions of the signal within this frequency range that contain luminance information.

The band pass filter 704 allows to pass portions of the composite signal having frequency components generally between 2.5 to 4.5 MHz. This portion of the composite signal contains primarily chrominance information, but as previously discussed, this portion or band of the signal allowed to pass also contains luminance information.

The band pass filter output is coupled to a chrominance demodulator 706. The chrominance demodulator 706 receives sine and cosine modulated signals at the subcarrier frequency from a subcarrier signal generator 708. The demodulator 706 utilizes these subcarrier signals to demodulate the chrominance signal. During demodulation, the demodulator separates or at least substantially separates the chrominance signal into I and Q components.

The output of the demodulator 706 is coupled to a format conversion module 710. The format conversion module 710 of the second embodiment changes the signal format from a 4:4:4 format to a 4:2:2 format. This advantageously reduces the storage requirements of the signal. Reducing the format to a 4:2:2 format does not result in data loss or reduced resolution because the signal is demodulated prior to format conversion. Demodulating the signal reduces the highest frequency of the signal and because the highest frequency is reduced, the sampling rate may also be reduced without data loss. This principle is exemplified by the Nyquist sampling rate theory that states the sampling rate need only be twice the highest frequency of the sampled signal in order to accurately recreate the signal. This relationship is expressed below:

$$\text{Nyquist Rate} = \text{Freq}_{sampling\ rate} \geq 2 \times \text{Freq}_{sampled\ signal}$$

Sampling rates greater than the Nyquist rate do not add to the resolution of the signal when the digital signal is restored to an analog format. Therefore, by demodulating and reducing the format of the signal prior to comb filtering, the memory requirements are reduced without sacrificing the resolution or integrity of the signal.

The dual outputs of the format conversion module 710 are coupled in tandem with the output of the notch filter 702 to a horizontal scaler 712. The horizontal scaler 712 adjusts the horizontal dimensions of the video image in accordance with a predetermined ratio or based on user input.

The horizontal scaler outputs 714, 716 are coupled to a vertical scaler and comb filter 718. The vertical scaler and comb filter 718 also receives as input the sine and cosine subcarrier signals from the signal generator 708. In this embodiment, the vertical scaler and comb filter 718 receives as a first input the horizontally scaled, notch filtered luminance signal 714 and as a second input the horizontally scaled, demodulated band pass filtered chrominance signal 716 in a reduced memory format.

Figure 16:
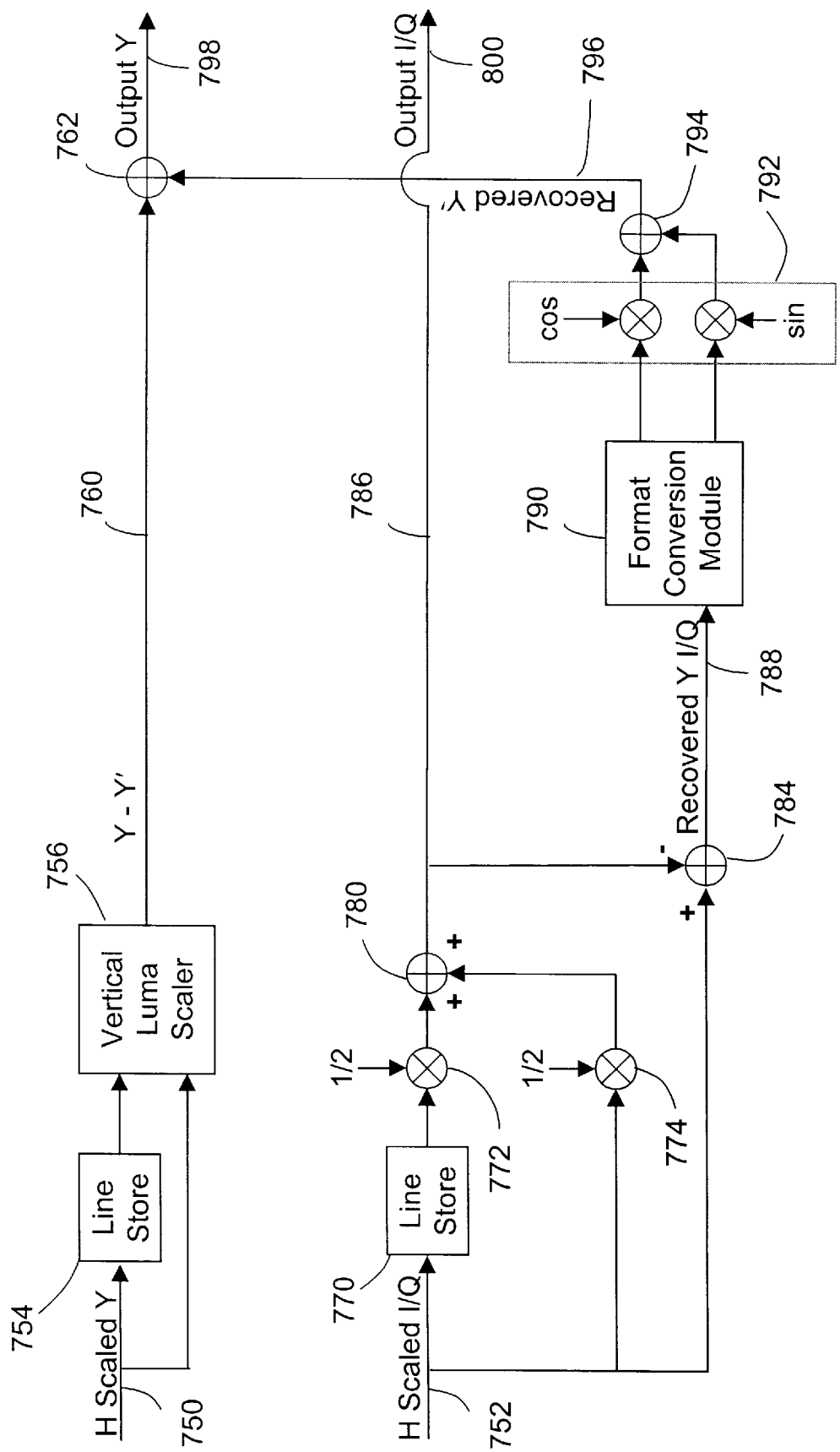
FIG. 16 illustrates a block diagram of a vertical scaler and two tap comb filter configured in accordance with the second embodiment of the subject invention.

Turning now to FIG. 16, a second embodiment of the vertical scaler and comb filter 718 is provided. For purposes of discussion the vertical scaler and comb filter 718 is separated into a luminance subsystem and a chrominance subsystem. Each is discussed below.

Luminance Subsystem

Through a signal line 750, the horizontally scaled luminance signal is provided to a line store 754. The line store 754 stores the input for a time equivalent to one line trace period, i.e. the time it takes to trace one line on a display, before providing its output to a vertical luminance scaler 756. One configuration of a line store comprises a series of registers configured to store the data samples until prompted by a control signal. In another configuration, the line store comprises computer memory accessed with a software pointer.

The vertical luminance scaler 756 also receives as an input the undelayed horizontally scaled luminance signal on line 750. The vertical luminance scaler interpolates the delayed and undelayed luminance signals to adjust the vertical dimension of the luminance signal. A luminance summing point 762 is coupled to the output of the vertical luminance scaler 756 over line 760. The signal on line 760 comprises a luminance signal that is missing certain luminance components due to notch filtering. For purposes of discussion, this signal is designated (Y–Y') where Y is the complete luminance signal and Y' represent the luminance components missing from the luminance signal.

A luminance output line 798 provides to the output of the luminance summing point 762.

Chrominance Subsystem

Through signal line 752, the horizontally scaled chrominance signal is provided to a line store 770, a first multiplier 774 and a summing point 784. The signal on line 752 is designated ($C_t+Y_t'$) where $C_t$ is the chrominance signal and $Y_t'$ is the luminance signal riding on the chrominance signal.

The line store 770 delays the signal for the period of a line trace. The output of the line store 770 connects to a second multiplier 772. Both multipliers 772, 774 reduce their received signals by one-half or about one-half through a multiplication process. This may be implemented in various ways, including but not limited to a simple shift of the data one bit at a time.

A first comb filter summing point 780 is coupled to the output of the first multiplier 774 and the output of a second multiplier 772. The first comb filter summing point 780 adds the two inputs and provides this combined signal on a line 786. This signal comprises the combed chrominance information (I/Q) and is provided at an output line 800.

The output of the summing point 780 also connects to an inverting input of a second summing point 784. The second summing point 784 also receives as a non-inverted input the horizontally scaled chrominance signal directly from line 752. The inverting input to the second comb filter summing point 784 negates the sign of the signal arriving on that input. The output of the second comb filter summing point 784 on a line 788 comprises the recovered portions of the luminance signal that undesirably remained with the chrominance signal after band pass filtering. These diagrams assume the I and Q data is multiplexed on a clock by clock basis, so one clock period is I data and the next clock period is Q data. Multipliers 772 and 774 and adders 780 and 784 therefore process both I and Q data. If the I and Q data is not multiplexed, then those four components must be duplicated so that the I data and the Q data can each have dedicated multipliers and adders.

A second format conversion module 790 is coupled to the output of the second summing point 784. The second format conversion module 790 restores the recovered luminance components to the 4:4:4 format, which includes separation of the multiplexed I and Q components into a non-multiplexed format. The second format conversion module 790 includes two outputs because the interpolation process creates twice as many data samples thereby requiring additional means to carry the data.

Next, a modulator 792 is coupled to the outputs of the second format conversion module 790 and re-modulates the signal using the appropriate sine and cosine signals at the subcarrier frequency. A summing point 794 connects to the dual outputs of the modulator 792 to combine the outputs of the modulator into a single signal on line 796.

The luminance summing point 762 is coupled via line 796 to the output of the summing point 794. Output line 798 is coupled to the output of the luminance summing point 762 and carries the combined luminance signal.

Operation of Second Embodiment

Figure 17:
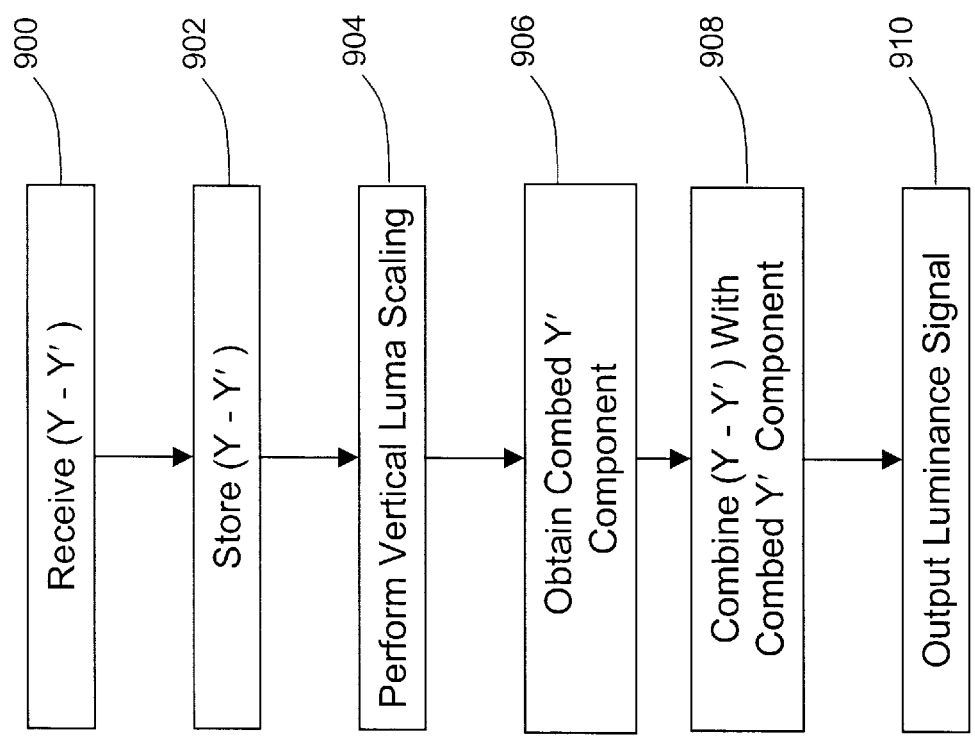
FIG. 17 illustrates an operational flow diagram of the luminance subsystem of the vertical scaler and two tap comb filter of the second embodiment.
Figure 18:
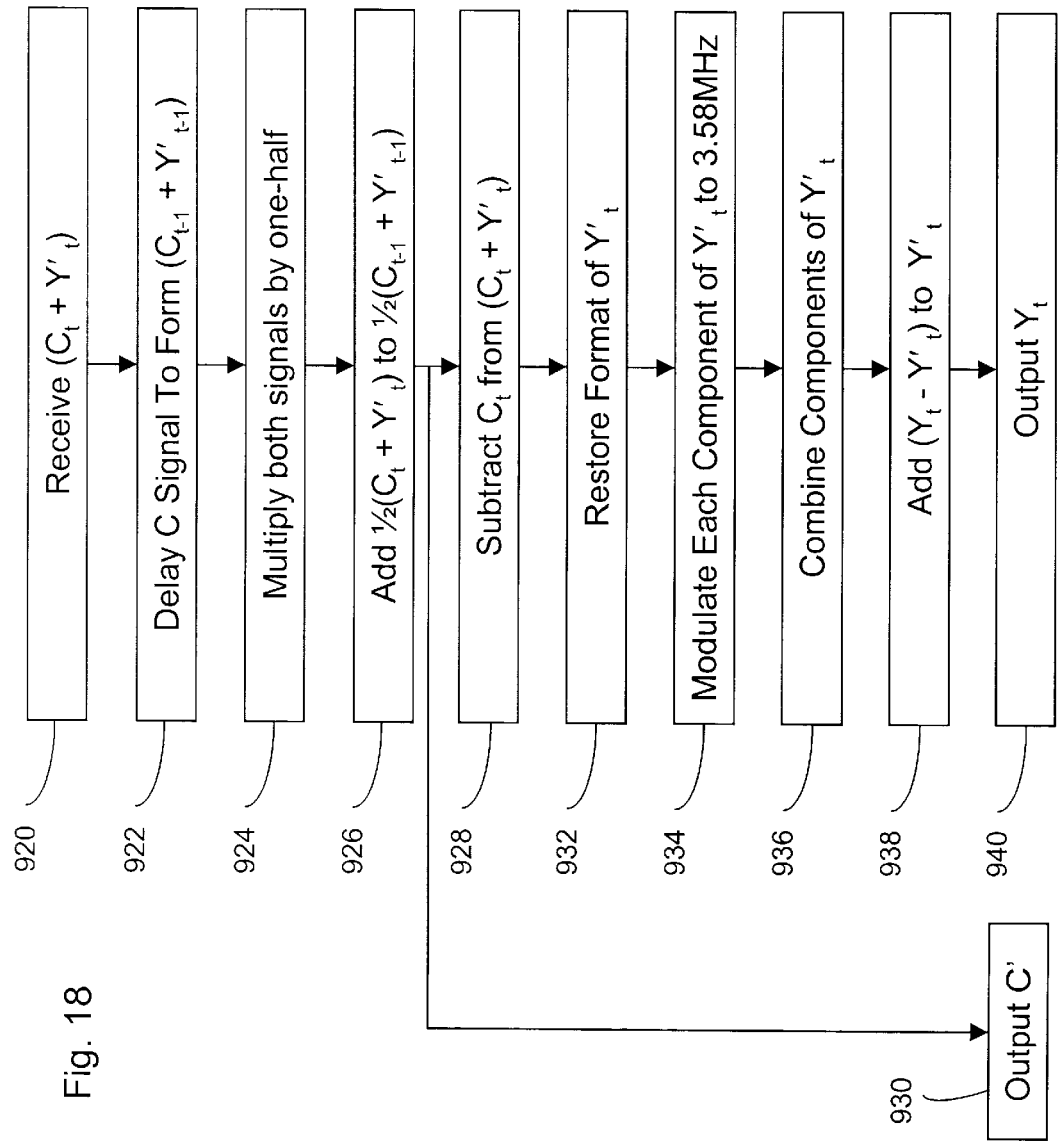
FIG. 18 illustrates an operational flow diagram of the chrominance subsystem of the vertical scaler and two tap comb filter of the second embodiment.

FIGS. 17 and 18 illustrate an operational flow diagram of the vertical scaler and two tap comb filter as shown in FIG. 16. FIG. 17 illustrates the operation of the luminance subsystem, while FIG. 18 illustrates the operation of the chrominance subsystem.

Operation of Luminance Subsystem

With reference to FIG. 17, at a step 900, the luminance subsystem receives the horizontally scaled luminance signal, denoted as (Y−Y'). Next, at a step 902, the operation stores one line of video for vertical luminance scaling. At a step 904, the operation performs vertical luminance scaling to adjust the vertical dimensions of the video image.

At a step 906, the luminance subsystem obtains the combed luminance components, denoted as Y', from the chrominance subsystem, the operation of which is presented in FIG. 18.

Next, at a step 908, the operation combines or adds the output of the vertical scaler, denoted Y−Y', with the input from the chrominance subsystem, denoted Y'. The following equation represents the combination.

$$(Y-Y')+Y'=Y$$

Y represents the complete luminance signal. Finally, at a step 910, the complete luminance signal Y is output on a line 798.

Operation of Chrominance Subsystem

FIG. 18 illustrates an operational flow diagram of the chrominance subsystem. At a step 920, the chrominance subsystem receives the horizontally scaled chrominance signal, which for purposes of discussion, is denoted ($C_t+Y_t'$), which is composed of I and Q components, [($I_t+Y_I'$), ($Q_t+Y_Q'$)].

Figure 19:
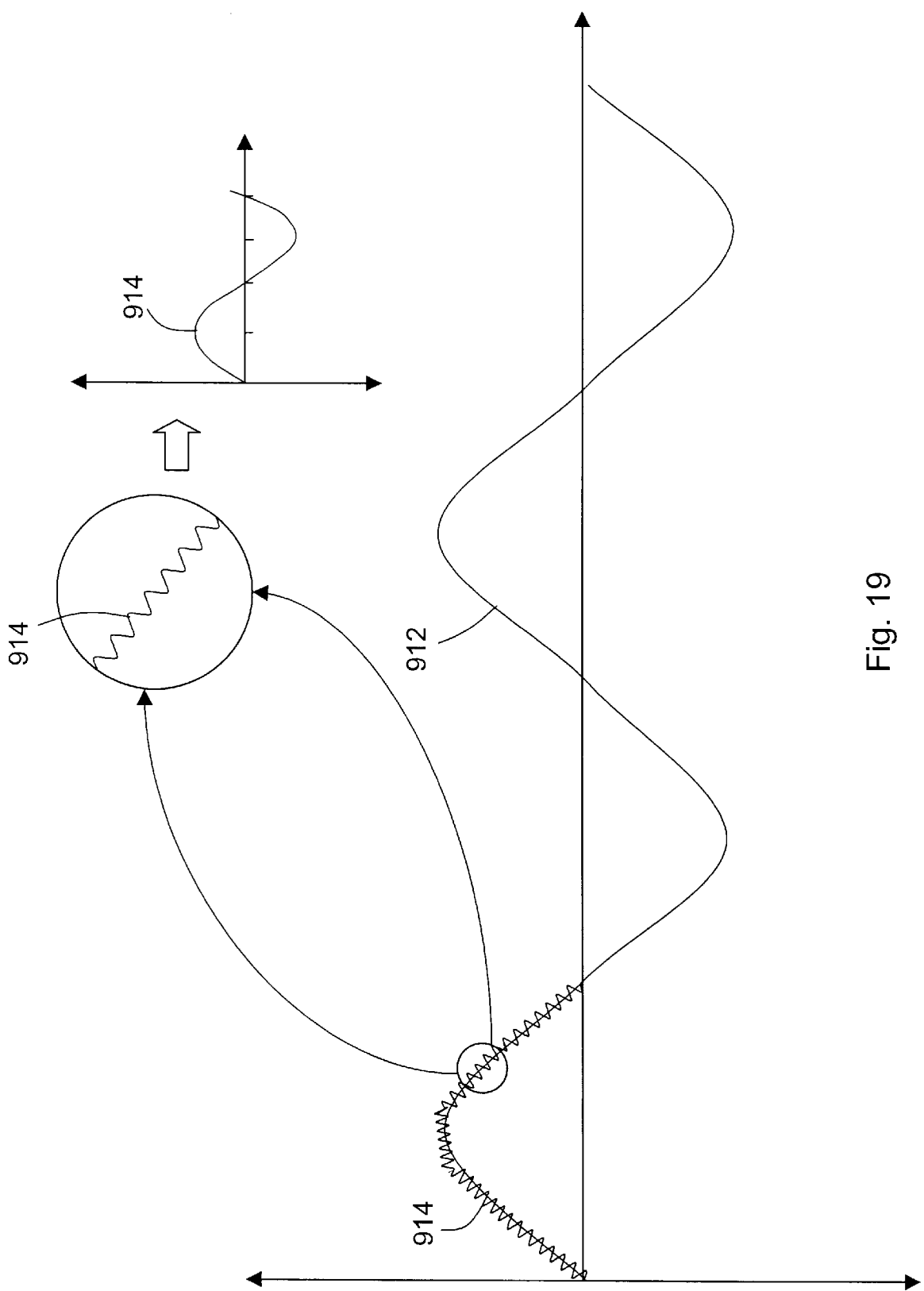
FIG. 19 illustrates a plot of a chrominance signal with luminance components.

An example of this ($C_t+Y_t'$) signal is shown in FIG. 19. The $C_t$ portion is signal 912 while the Y' portion is denoted as signal 914. The signal $C_t+Y_t'$ contains the chrominance signal $C_t$ and a portion of the luminance signal $Y_t'$ riding on the chrominance signal.

Figure 20:
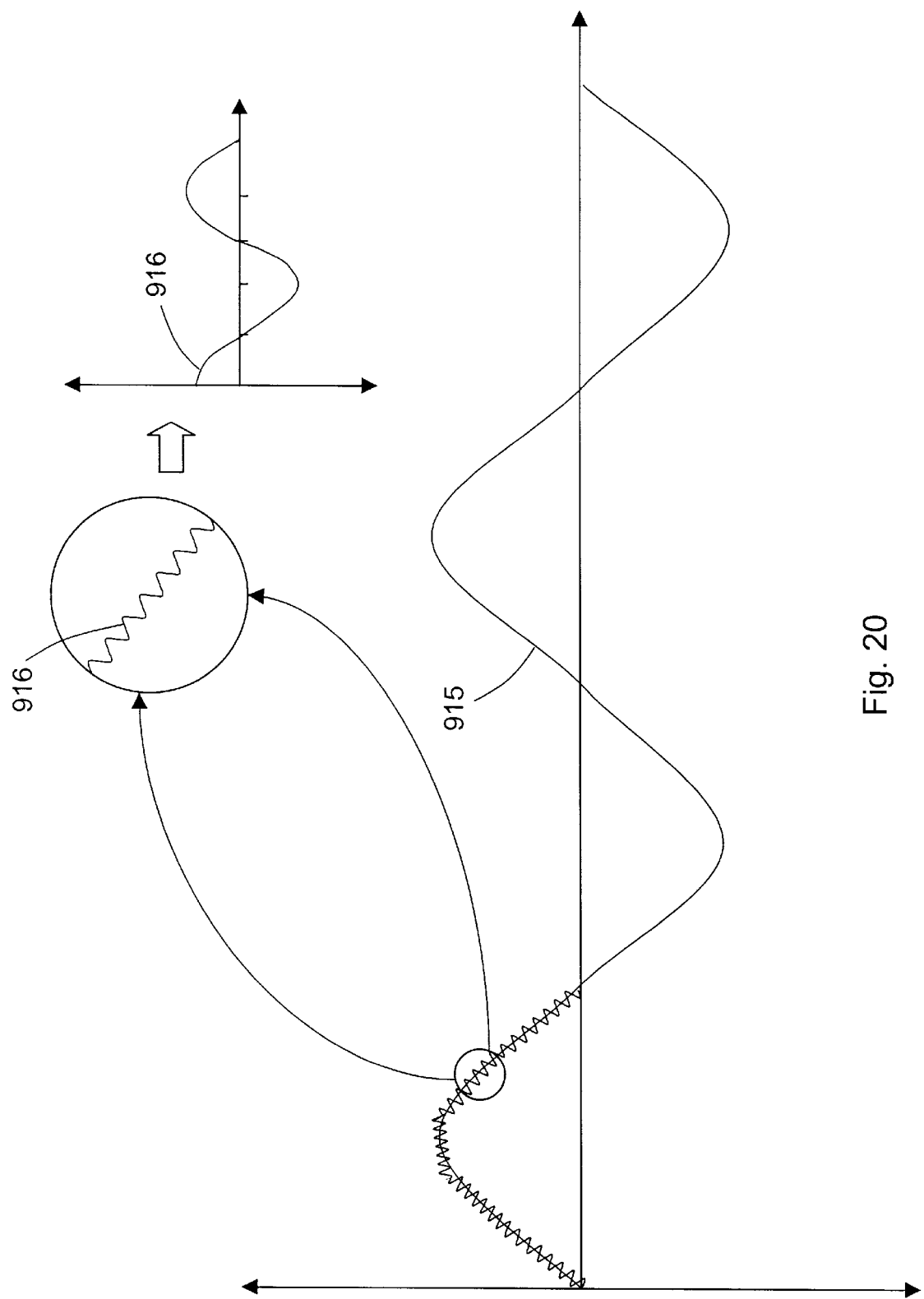
FIG. 20 illustrates a plot of a time delayed chrominance signal with luminance components.

Next, at a step 922, the chrominance signal $C_t+Y_t'$ is time delayed in line store 770 to form $C_{t-1}+Y_{t-1}'$. An example of this time delayed signal 915, 916 is illustrated in FIG. 20. As shown, the $C_{t-1}$ signal 915 remains in-phase with the signal $C_t$ while the $Y_t'$ signal 916 is now out of phase by 180 degrees, or at least about 180 degrees, with $Y_{t-1}'$.

At a step 924, the operation reduces by one-half, or at least about one-half, the amplitude of the signal ($C_t+Y_t'$) and the signal ($C_{t-1}+Y_{t-1}'$). A one-half amplitude reduction is advantageous because at a step 926 the signals are added together in the first comb filter summing point 780. The following equation represents this operation.

$$\tfrac{1}{2}(C_t+Y_t')+\tfrac{1}{2}(C_{t-1}+Y_{t-1}')$$

The signal component $\tfrac{1}{2}C_t$ overlaps in-phase with the $\tfrac{1}{2}C_{t-1}$ component to form $C_t$. The signal component $\tfrac{1}{2}Y_t'$ is 180 degrees out of phase with the component $\tfrac{1}{2}Y'_{t-1}$ causing the $Y_t'$ component to cancel with the $Y_{t-1}'$ component. Hence the resulting signal is purely or at least substantially the chrominance information, denoted $C_t$.

At a step 930, the pure or at least substantially pure chrominance signal $C_t$ is output on a line 800.

Simultaneously, the operation isolates or at least substantially isolates the luminance components $Y_t'$ from the combined signal $C_t+Y_t'$. At a step 928, the second comb filter summing junction 784 subtracts the pure chrominance signal $C_t$ from the original chrominance signal ($C_t+Y_t'$). This is shown in the equation below and illustrated in FIG. 21.

$$(C_t+Y_t')-C_t=Y_t'$$

Figure 21:
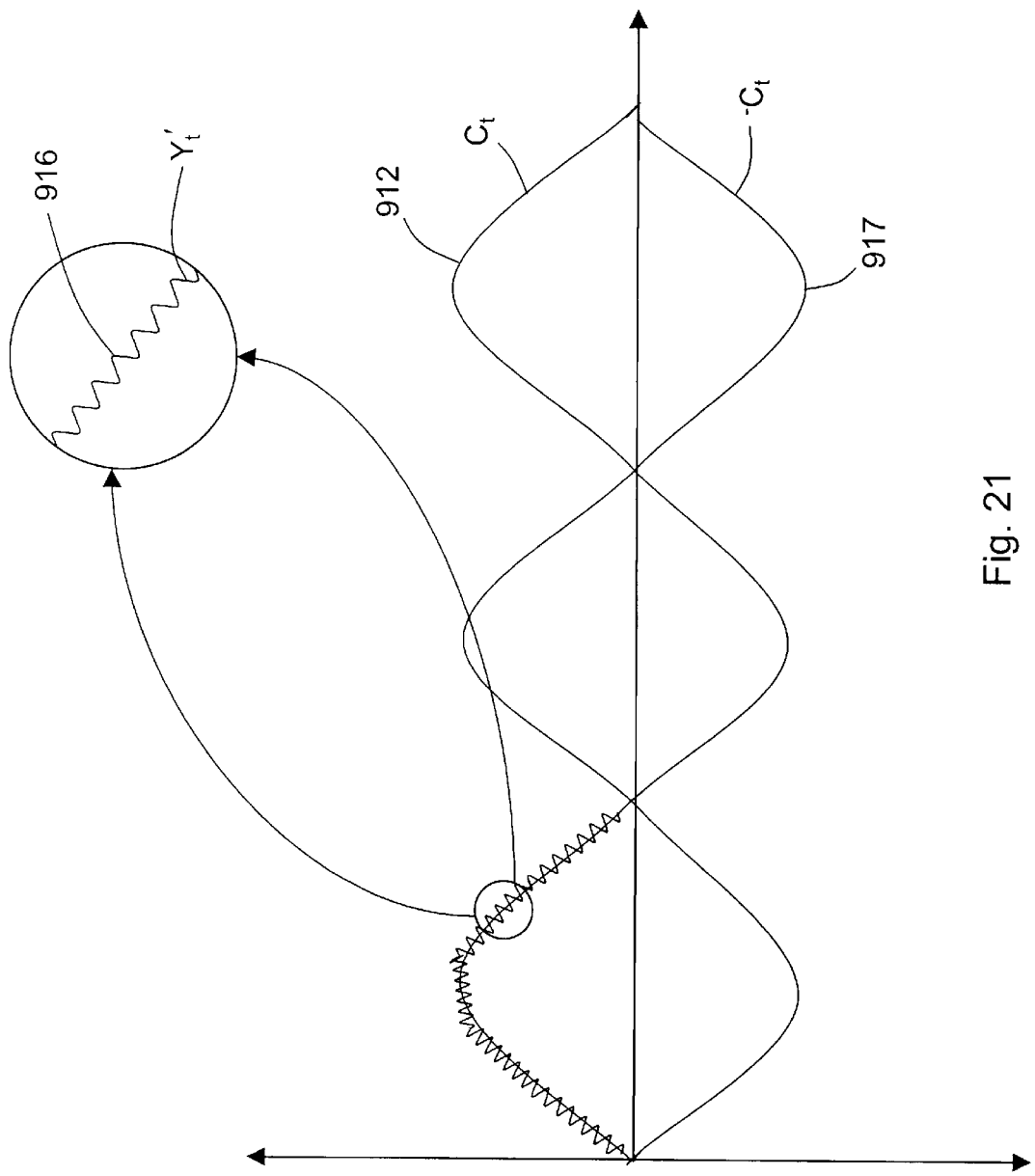
FIG. 21 illustrates a plot of the combination of the chrominance signal with luminance components and the time delayed chrominance signal with luminance components.
Figure 22:
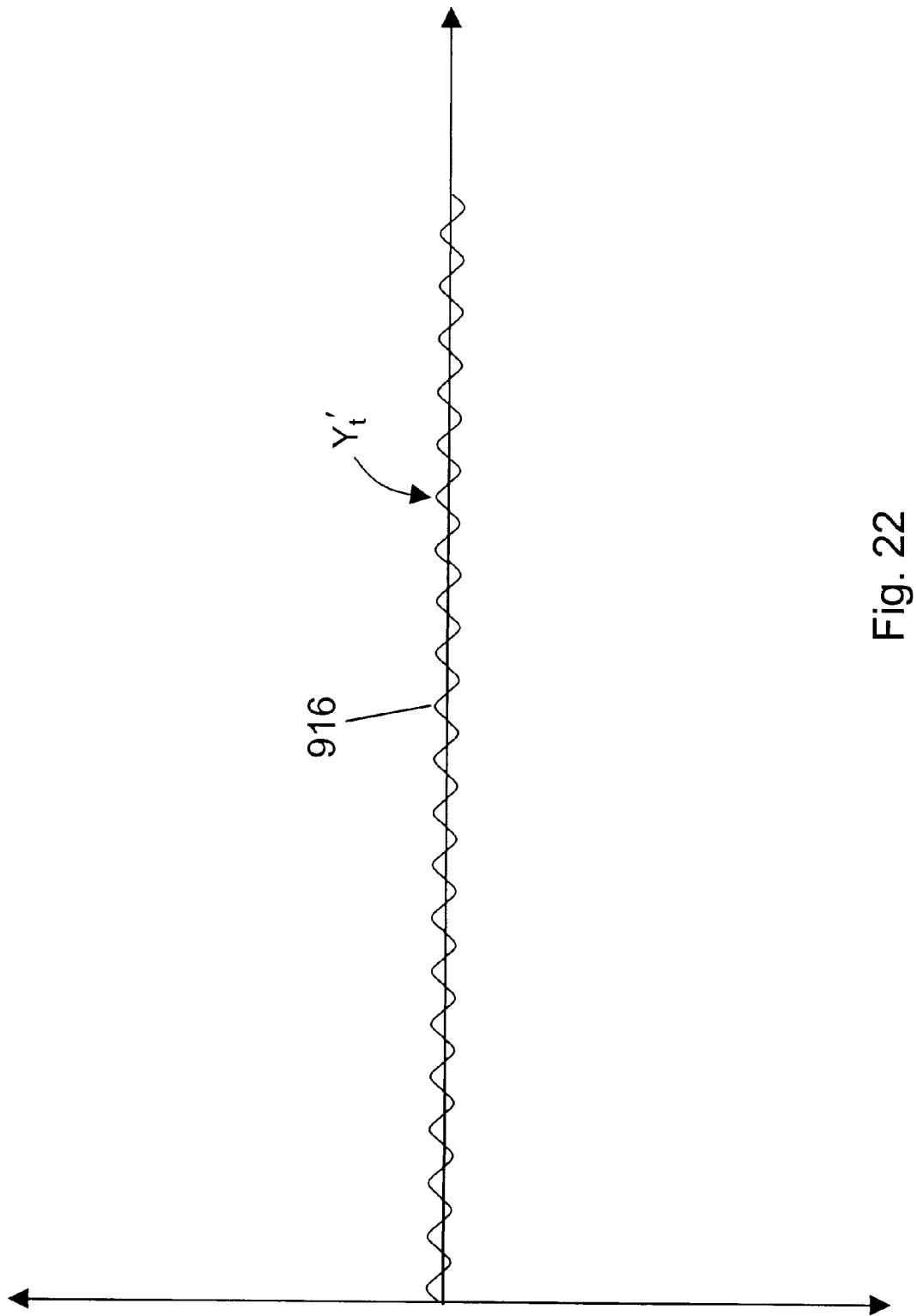
FIG. 22 illustrates a plot of the isolated luminance components.

As shown in FIG. 21, the original chrominance signal 912 and the luminance information 916 are added to the negative of the pure chrominance signal 917. This in effect subtracts the pure chrominance $C_t$ signal from the combined signal ($C_t+Y_t'$), an operation which leaves only the luminance portion of the signal ($Y_t'$). FIG. 22 illustrates the luminance component $Y_t'$, shown as line 916, that has successfully been isolated.

Next, at a step 932, the format of the luminance signal Y'$_t$ is restored to a 4:4:4 format and the I and Q components are demultiplexed for purposes of re-modulation. This is denoted by Y'$_t$(I) and Y'$_t$(Q).

At a step 934, the operation re-modulates each component of Y'$_t$(I) and Y'$_t$(Q) to the carrier frequency centered at 3.58 MHz, the general center frequency of the notch filter. This advantageously aligns at the proper frequency the combed Y'$_t$ components of the luminance information with the original luminance signal (Y$_t$−Y'$_t$). Absent the re-modulating alignment process, the combed luminance signal Y'$_t$ would, when combined in a step 938, not be combined at the right frequency position in the luminance signal.

Next, at a step 936, the operation combines in modulator summing point 794 the Y'$_t$(I) and Y'$_t$(Q) components to form a remodulated Y'$_t$ signal.

At a step 938, the combed luminance components Y'$_t$ are combined with the original luminance signal (Y$_t$−Y'$_t$). The following equation represents this combination.

$$(Y_t - Y'_t) + Y'_t = Y_t$$

Thus, at a step 940, the complete luminance signal Y$_t$ is output on line 798.

This process advantageously shares the benefits discussed above regarding reduced memory requirements in the line store in the comb filter and generally eliminates susceptibility to interference from line-to-line subcarrier phase differences. Further, this method and apparatus restores or at least substantially restores the luminance signal to its original composition by adding in the otherwise absent Y'$_t$ component.

Third Embodiment—Multiple-Tap Comb Filter

FIG. 23 illustrates a third embodiment of the vertical scaler and comb filter configured with a three tap comb filter. With reference to FIG. 16, like elements are numbered with like reference numerals. As shown in FIG. 23, a three tap comb filter replaces the two tap comb filter of FIG. 16. The configuration of the three tap comb filter is now discussed.

The input line 752 is coupled to a first line store 820 and a first ¼ multiplier 822. The ¼ multiplier 822 reduces the amplitude of the received signal by one quarter and provides it to the first comb filter summing point 780.

The first line store 820 delays or stores the incoming signal for a period equal to the line trace time and provides the output on a line 824. Line 824 connects to a ½ multiplier unit 832, a second line store 830, and the second comb filter summing junction 784. The ½ multiplier unit 832 reduces the amplitude of the incoming signal by one half. The output of the ½ multiplier unit 832 connects to the first comb filter summing point 780.

The second line store 830 delays the signal on line 824 a time equal to a line trace and provides the twice delayed output on a line 831 to a second ¼ multiplier unit 834. The output of the second ¼ multiplier unit 834 connects to the first comb filter summing point 780.

Operation of three tap comb filters is known by those of skill in the art and accordingly is not described in detail herein. The weighting applied by the multipliers 822, 832, and 834 in conjunction with the first comb filter summing point 780 ensures proper cancellation between overlapping signals. The other aspects of the operation of this embodiment do not differ significantly from the operation of the second embodiment. In particular, the re-formatting, re-modulation and combination of the combed luminance components do not significantly differ from the embodiment shown and described in FIG. 16 and FIGS. 17 and 18.

The advantages gained from restoring the combed components of the luminance signal to the notch filtered luminance signal are realized regardless of the number of taps of the comb filter. Indeed, the greater the number of taps, the greater the number of line stores. The greater the number of line stores in the comb filter, the greater the memory savings that result from format conversion of the chrominance signal. It is fully contemplated that the principles of the present invention may be applied to comb filters having any number of taps.

Fourth Embodiment—No Format Conversion Module

In a fourth embodiment, the subject invention is embodied without the format conversion module identified as element 710 (FIG. 15) and 790 (FIG. 16). Configuring the subject invention without the format conversion module advantageously reduces the cost of the system by eliminating this componentry. Absent the format conversion module 710, 790, the separation system does not enjoy the memory saving attributes associated with presenting a signal sampled at a lower sampling rate to the line stores in the comb filter. However, inclusion of the format conversion module is not a requisite to practice the subject invention.

Fifth Embodiment Adaptive Filtering

Figure 24:
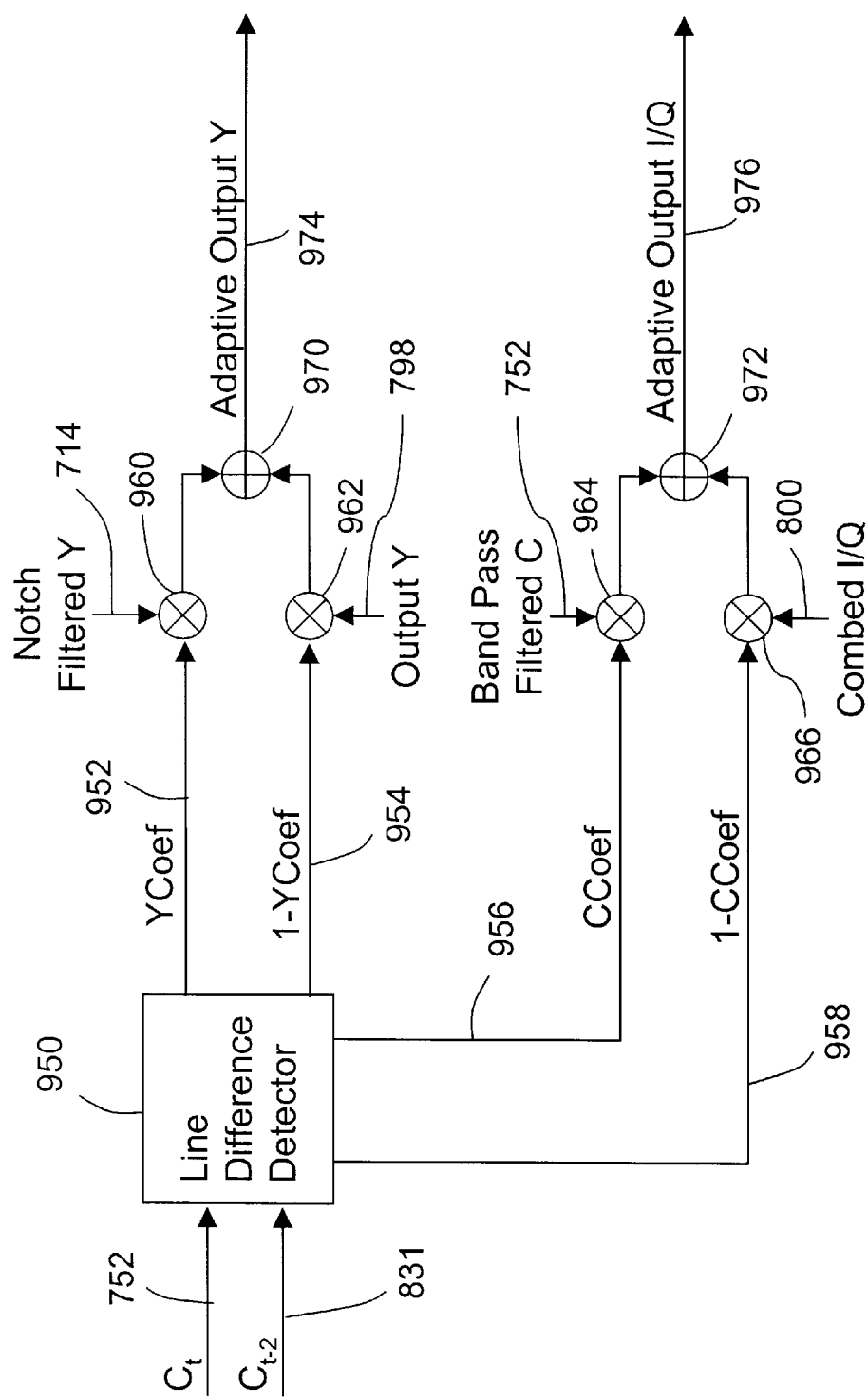
FIG. 24 illustrates a block diagram of an adaptive output weighting system in accordance with the fifth embodiment of the subject invention.

FIG. 24 illustrates adaptive circuitry configured to integrate with the circuitry of the third embodiment shown in FIG. 23. With reference to FIG. 23, like elements in FIG. 24 are referenced with like reference numerals.

In summary, the adaptive circuitry dynamically generates variable coefficients based on the degree of difference between pixel values separated by one or more lines of video. The coefficients control the degree of weighting assigned to the notch and band pass filtered signals and the comb filtered signals during the formulation of the final output signal.

In particular, a line difference detector 950 taps onto line 752 and line 831 to obtain the signals thereon. Line 752 provides the horizontally scaled chrominance signal at t=0 while line 831 provides the horizontally scaled chrominance signal after two line delays, i.e. at a time t−2.

The line difference detector 950 compares the signals on these two lines on a pixel-by-pixel basis for differences. It is contemplated that an evaluation on other than a pixel-by-pixel basis may be undertaken. The pixels subject to comparison are separated by two lines or a multiple of two lines, to ensure that the subcarrier phase is the same for both pixels. In this embodiment, the chrominance portion of the signal has been demodulated (block 706, FIG. 15). Because the chrominance signal includes certain luminance components (C$_t$+Y'$_t$) in a demodulated state, the chrominance signals, when compared line-to-line, are in-phase while the luminance component riding thereon are out of phase between adjacent lines by 180 degrees. Thus to provide accurate line difference detection for both the chrominance components and the luminance components riding on the chrominance signal, the difference detector 950 must compare non-adjacent video lines. Stated another way, the difference detector 950 must compare pixels at C$_t$ to pixels at C$_{t-2}$.

If the line difference detector 950 compared adjacent lines, that is lines at t=0 and t=1, the out of phase luminance components would provide inaccurate results. The results would be inaccurate because the luminance components that are 180 degrees out of phase line-to-line would be different thereby giving the false impression of a change in pixel values.

The line difference detector 950 compares the difference between the signal at t=0 and t=2 and, depending on the amount of difference, generates a Y coefficient (Ycoeff) and C coefficient (Ccoeff). In this embodiment, each of the Ycoeff and Ccoeff vary between 0 and 1 in value. The line difference detector 950 also performs mathematical manipulation to generate a value representing one minus the Ycoeff (1−Ycoeff) and one minus the Ccoeff (1−Ccoeff). Thus, as the Ycoeff increases the value for (1−Ycoeff) decreases.

Luminance Weighting System

A multiplier 960 is coupled to the Ycoeff output via a line 952 and to the notch filter output ($Y_t$−$Y'_t$) on line 750. The multiplier 960 multiplies the notch filter output ($Y_t$−$Y'_t$) by the value of the Ycoeff and outputs this value to a summing point 970.

A multiplier 962 is coupled to the (1−Ycoeff) output via a line 954 and to the complete luminance output $Y_t$ on line 798. The multiplier 960 multiplies the comb filtered Y output ($Y_t$) by the value of (1−Ycoeff) and outputs this value to a summing point 970.

The summing point 970 adds each of the weighted portions of the inputs provided from the multipliers 960, 962 and outputs the sum on the luminance adaptive output line 974. This is the luminance signal of the adaptive signal separation system of the fifth embodiment.

Chrominance Weighting System

A multiplier 964 is coupled to the Ccoeff output via a line 956 and to the band pass filtered chrominance output ($C_t$+ $Y'_t$) from line 752. The multiplier 964 multiplies the band pass filtered chrominance output ($C_t$+$Y'_t$) by the value of the Ccoeff. and outputs this value to a summing point 972.

A multiplier 966 is coupled to the (1−Ccoeff) output via a line 958 and to the comb filtered chrominance output $C_t$ on line 800. The multiplier 966 multiplies the comb filtered chrominance output $C_t$ by the value of (1−Ccoeff) and outputs this value to a summing point 972.

The summing point 972 adds each of the weighted portions of the inputs provided from the multipliers 964, 966 and outputs the sum on the chrominance adaptive output line 976. This is the chrominance signal of the adaptive signal separation system of the fifth embodiment.

The adaptively adjusted luminance output on line 974 and the adaptively adjusted chrominance output on line 976 represent the dynamically adjusted output of 1) the notch and band pass filtered composite signal and 2) the modified comb filter operating in accordance with the subject invention. Thus, this circuit dynamically selects, on a pixel by pixel basis or on a line by line basis, the amount of 1) a signal separated using basic notch and band pass filtering and 2) a signal separated using the subject invention's comb filtering process.

Signal Selection Process

By way of example, if the line difference detector 950 finds a difference between compared pixels, it increases the value of the Ycoeff. and the Ccoeff. This in turn causes the values of 1−Ycoeff and 1−Ccoeff to decrease. In turn, the multipliers 960, 962, 964, 966 provide greater weight to the signals obtained from basic notch and band pass filtering and less weight to the signals obtained from the comb filter. The summing points 970, 972 form the final output on lines 974 and 976 based on the more heavily weighted signals from notch and band pass filtering. Thus, in instances of motion or color change in alternating lines, the adaptive system of the fifth embodiment predominately utilizes the notch and band pass filtered outputs. Because of the drawbacks of comb filtering in relation to video signals that represent motion or color changes, the system advantageously adjusts the output thereof as appropriate, and more specifically, the filtering method used to form the output. The following table provides a more complete but general illustration of this point:

| Video Image Properties | Line Difference Detector | Ycoeff. and Ccoeff. Values | 1-Ycoeff. and 1-Ccoeff Values | Predominate Separation Method |
|---|---|---|---|---|
| motion or color change | Difference Detected | Increase | Decreases | Notch and Band Pass Filtering |
| no motion or color change | No Difference Detected | Decrease | Increases | Comb Filtering |
| moderate motion or color change | Moderate Difference Detected | set to about .5 | equates to about .5 | Combination of Both Notch and Band Pass and Comb Filtering |

Sixth Embodiment—Adaptive Filtering with Adjustable Thresholds

In another embodiment, the signal selection or signal weighting performed in relation to the selection of the filtering method utilized to form the output is selected based on a threshold value, in contrast to a sliding scale as employed in the fifth embodiment.

Figure 25:
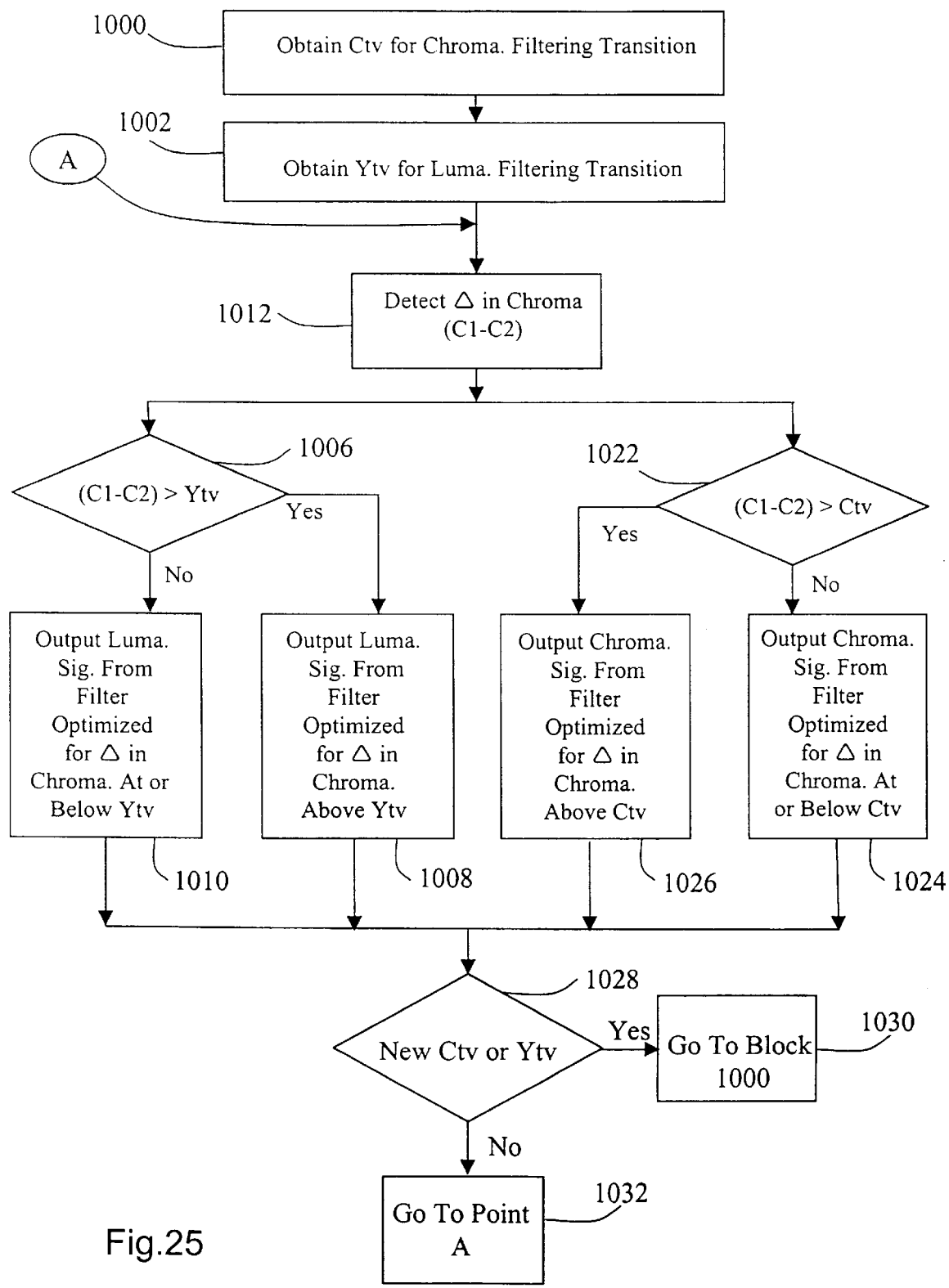
FIG. 25 illustrates method of operation of an adaptive output weighting system in accordance with a sixth embodiment of the subject invention.

FIG. 25 illustrates a method of operation for adjustable threshold adaptive filtering. At a first step 1000, the adaptive system obtains a chrominance threshold value (Ctv). The Ctv represents the threshold value that marks the jump point at which the system changes the filtering method for the chrominance signal.

At a step 1002, the system obtains a luminance threshold value (Ytv). The Ytv represents the threshold value that marks the jump point at which the system changes the filtering method for the luminance signal.

In one preferred embodiment, the system obtains the Ctv and Ytv from a user input such as from a computerized user interface or manual adjustment. In an alternative embodiment, the Ctv and Ytv values are permanently configured for a particular system.

At a step 1012, the system detects the change or delta (a) in the chrominance value between the input pixel one line prior to the current output pixel and the input pixel one line after the current output pixel. The change in chrominance is represented (C1−C2). The chrominance value for each pixel is composed of two components, I and Q, so the difference between two chrominance value s is also composed of two components. Since the chrominance value for the input pixels to the comb filter contain the chrominance as well as some of the luminance for that pixel, changes in that chrominance value will reflect changes in the chrominance as well as changes in the luminance that passed in to the chrominance channel.

Operation of Luminance Signal Filter Selection

At a decision step 1006, the change in chrominance value (C1−C2) is compared to the threshold value Ytv. This comparison can be performed in various ways including but not limited to comparing the vector length, or comparing the sum of the vector components, or comparing each component of the vector separately.

If the change in chrominance value (C1−C2) is greater than the threshold Ytv, the operation progresses to a step 1008. At step 1008, the system outputs the luminance signal from the filter that is optimized for changes in chrominance value that are above Ytv.

If the change in chrominance value (C1−C2) is less than or equal to the threshold Ytv, the operation progresses to a step 1010. At step 1010, the system outputs the luminance signal from the filter that is optimized for changes in chrominance value that is at or below Ytv.

By way of example, if (C1−C2)>Ytv then the adaptive system utilizes tile output from the notch filter because in instances of change or at least significant change in chrominance values, which may represent changes in chrominance or luminance, the notch filtering method is superior over comb filtering. However, if (C1−C2) is <Ytv, then the adaptive system utilizes the output from the comb filter because, in instances when there is little change in chrominance values, comb filtering provides superior results over notch filtering. Ytv is selected to optimize the output and may conveniently be adjusted by the user based on personal preference.

After steps 1008 and 1010, the system progresses to decision step 1028, discussed below in greater detail.

Operation of Chrominance Signal Filter Selection

At a decision step 1022, the change in chrominance value (C1−C2) is compared to the threshold value Ctv. This comparison could be performed in various ways including but not limited to comparing the vector length, or comparing the sum of the vector components, or comparing each component of the vector separately.

If the change in chrominance value (C1−C2) is greater than the chrominance threshold Ctv, the operation progresses to a step 1026. At step 1026, the system outputs the chrominance signal from the filter that is optimized for changes in chrominance value that are above Ctv.

If the change in chrominance value (C1−C2) is less than or equal to the chrominance threshold Ctv, the operation progresses to a step 1024. At step 1024, the system outputs the chrominance signal from the filter that is optimized for changes in chrominance value that are at or below Ctv.

By way of example, if (C1−C2)>Ctv, then the adaptive system utilizes the output from the band pass filter because, in instances of change or at least significant change in chrominance values, the band pass filtering method is superior over comb filtering. However, if (C1−C2) is <Ctv, then the adaptive system utilizes the output from the comb filter because, in instances when there is little change in chrominance values, comb filtering provides superior results over band pass filtering. Ctv is selected to optimize the output and may conveniently be adjusted by the user based on personal preference.

After steps 1008 and 1010, the system progresses to decision step 1028. At decision step 1028, the system queries the Ctv values and the Ytv values to evaluate whether the threshold values have changed.

If there is a new Ctv value or Ytv value, the operation progresses to a step 1030, which returns to step 1000 to obtain the updated Ctv and/or Ytv values. In one configuration, the system obtains these values from a computerized user interface. In another configuration, they are manually input by a user.

Alternatively, if at decision step 1028 the system does not detect new Ctv or Ytv values, the operation progresses to a step 1032. At step 1032, the system jumps to Point A wherein the operation progresses with the same Ctv and Ytv values to steps 1004 and step 1020, both of which are discussed above.

Implementation Example

One example implementation of the subject invention is embodied in a video capture processor and scaler for television and VCR input. In this example embodiment, the subject invention is embodied in the Bt835 VideoStreaM™ III Decoder available from Conexant Systems, Inc. of San Diego, Calif., formerly Rockwell Semiconductor Systems.

The Bt835 is a high quality single chip composite NTSC/PAL/SECAM video and S-video decoder having low power consumption requirements. The subject invention embodied therein integrates with a 3-line adaptive comb filter in accordance with the principles of the subject invention to overcome the disadvantages of traditional comb filter artifacts.

Figure 26:
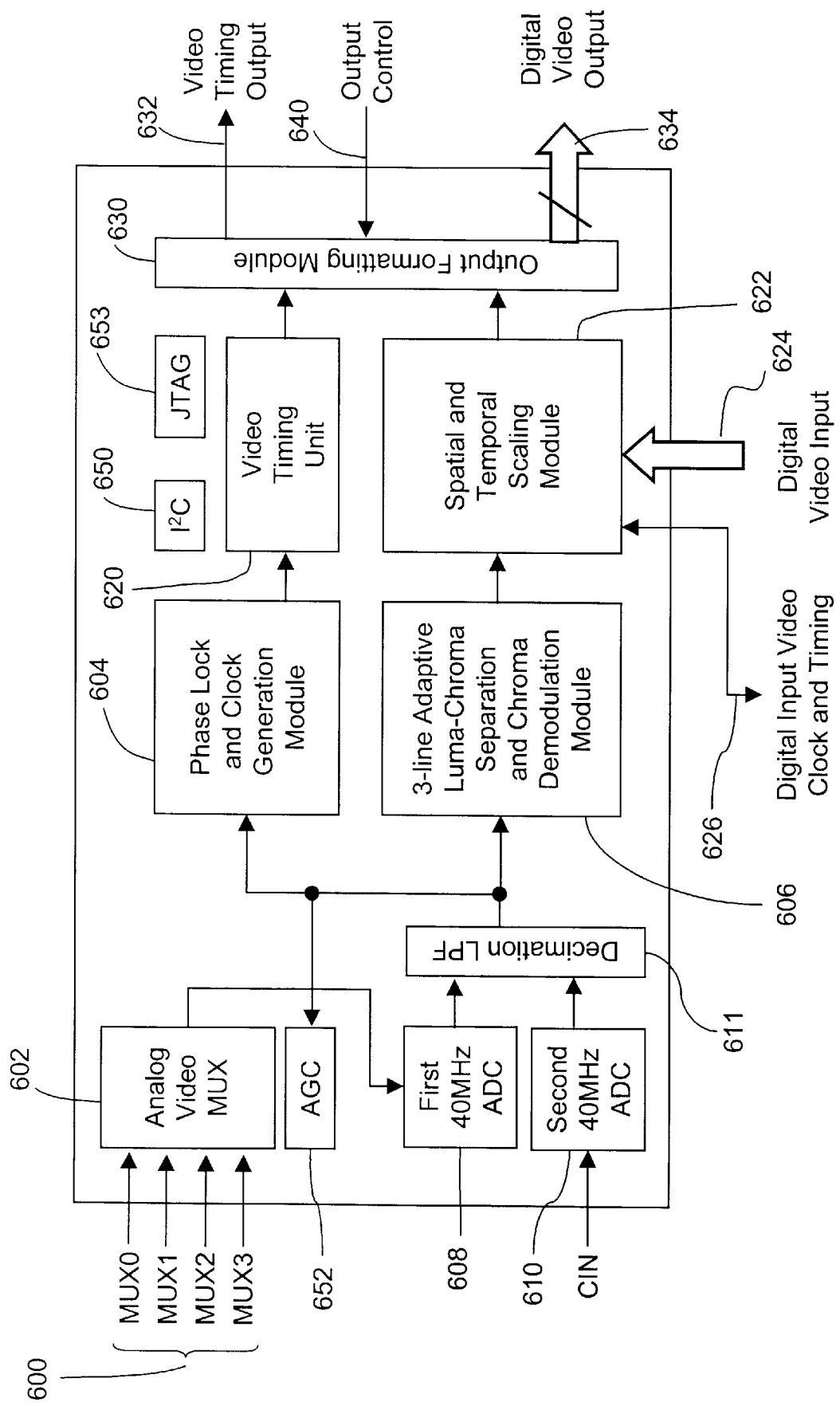
FIG. 26 illustrates a block diagram of an exemplary embodiment of the subject invention.

FIG. 26 illustrates a block diagram of the configuration of the Bt835, including the 3-line adaptive comb filter for luma-chroma separation. The block diagram of the Bt835 will now be described.

Input port 600 connects to an analog video multiplexer 602. The analog video multiplexer provides means to simultaneously receive input from multiple video sources, such as a receiver, VCR, camcorder, or antenna. The output of the multiplexer 602 connects to a first 40 MHz analog to digital converter 608. The 40 MHz analog to digital converter 608 (A/D) converts the analog input into a digital output. The output of the 40 MHz A/D converter 608 connects to a decimation low pass filter 611. A second 40 MHz analog to digital converter 610 obtains an analog chrominance signal from a C input, and, after conversion to a digital format, outputs the digital signal to the decimation low pass filter 611. The decimation low pass filter 611 performs two times decimation on the outputs of the over-sampled A/D converters 608, 610 so that a simpler anti-aliasing filter may be utilized in the analog domain.

The output of the decimation low pass filter 611 connects to a phase lock and clock generation module 604, a 3-line adaptive luma-chroma separation and chroma demodulation module 606, and an automatic gain control (AGC) 652. The phase lock and clock generation module 604 synchronizes the phase of the video signal and generates appropriate clock signals for operation of the digital circuitry.

The 3-line adaptive luma-chroma separation and chroma demodulation module 606 separates the luminance and chrominance components from the received signal by adaptively utilizing either of a notch and band pass filter combination or a 3 tap comb filter depending on the attributes of the received signal. The 3-line adaptive luma-chroma separation and chroma demodulation module 606 also includes a chroma demodulation capability to demodulate the chrominance portion of the signal in accordance with the subject invention. Advantageously, the combed portions of the luminance signal are re-formatted, re-modulated and combined with the notch filtered luminance signal to prevent unwanted artifacts in the output and provide a more robust and complete luminance signal.

The AGC 652 enables the Bt835 to compensate for reduced amplitude in the analog circuit received at input 600.

The output of the phase lock and clock generation module 604 connects to a video timing unit 620. The video timing unit detects sync pulses in the incoming signal and generates internal and external timing signals to insure accurate timing of the video output.

The output of the 3-line adaptive luma-chroma separation and chroma demodulation module 606 connects to a spatial and temporal scaling module 622 that is responsible for adjusting the size and timing of the video display. The temporal scaling module 622 also receives input from a digital video input 624 in conjunction with a digital input video clock and timing input 626. These inputs provide means for the Bt835 to receive digital video input.

The outputs of the video timing unit 620 and the spatial and temporal scaling module 622 connect to an output formatting module 630. The output formatting module 630 manipulates the image signal to a format compatible for transmission to a display monitor or video processing card. The output formatting module 630 includes a 16 bit digital video output 634 and a video timing output 632. These outputs 634, 632 connect to a display or video processing card. An output control line 640 provides input to the output formatting module 630 to partially control the output of the output formatting module 630.

The Bt835 also includes and an I²C bus 650 and a JTAG module 653. The I²C bus (Inter-IC bus) 650 is a multi-master bus used to interconnect integrated circuits. The JTAG module provides compatibility with the JTAG testing standard (Joint Test Action Group).

Figure 27:
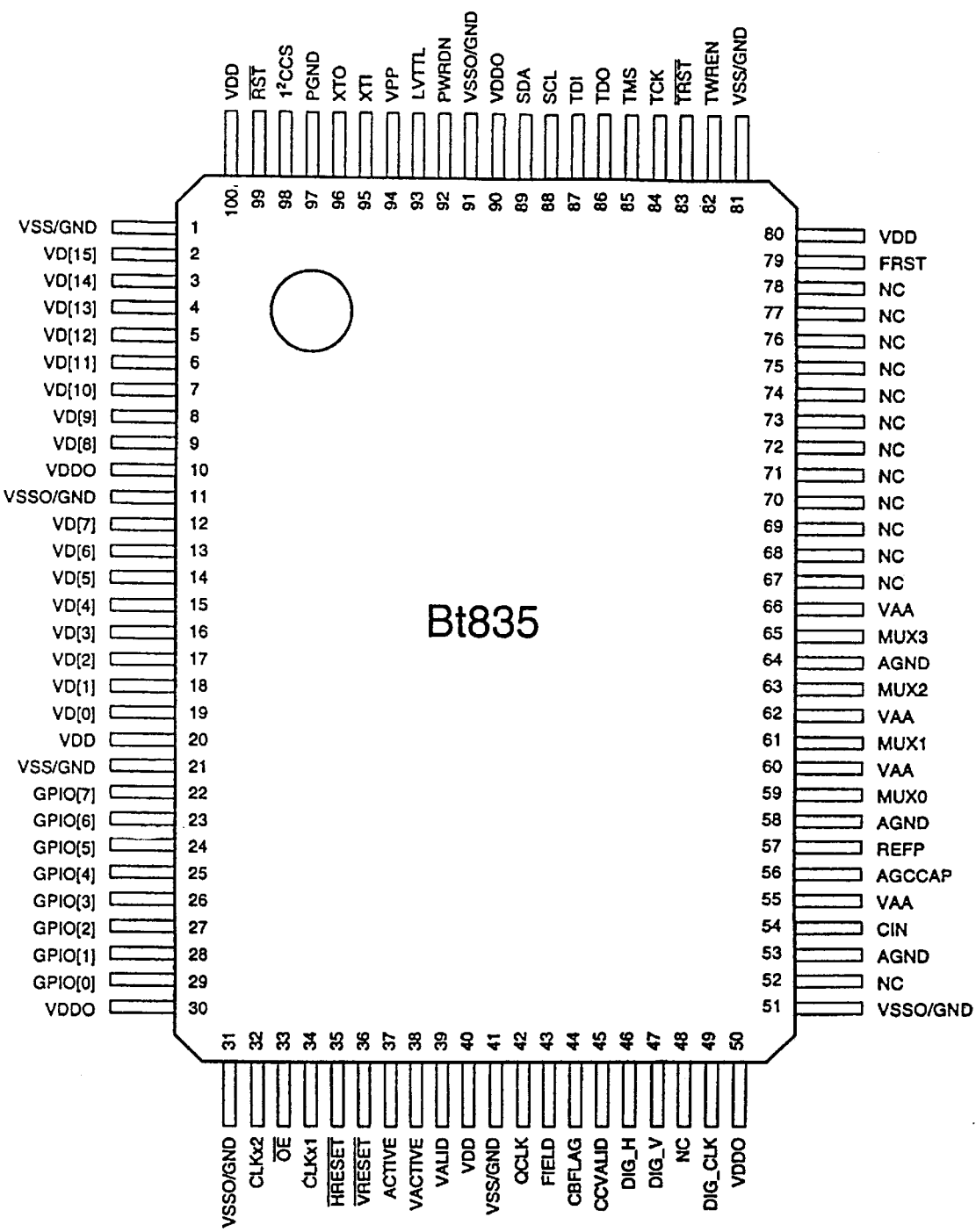
FIG. 27 illustrates the pinouts of an exemplary embodiment of the subject invention.

FIG. 27 illustrates the pin outs for the Bt835. Additional information regarding the function of each pin out and the Bt835 in general is available in a document entitled Advance Information on the Bt835 VideoStream III Decoder, from Conexant Systems, Inc. (formerly Rockwell Semiconductor Systems) of San Diego, Calif., which is hereby fully incorporated by reference herein as though set forth in full.

While particular embodiments and examples of the present invention have been described above, it should be understood that they have been presented by way of example only and not as limitations. Those of ordinary skill in the art will readily appreciate that other various embodiments or configurations adopting the principles of the subject invention are possible. The breadth and scope of the present invention is defined by the following claims and their equivalents, and is not limited by the particular embodiments described herein.

What is claimed is:

1. A method for separating a composite signal comprising:
   notch filtering the composite signal to form a notch filtered signal;
   band pass filtering the composite signal to form a band pass filtered signal;
   demodulating the band pass filtered signal to form a demodulated signal;
   comb filtering the demodulated signal to form a primary signal and a secondary signal wherein the primary signal comprises desired components of the band pass filtered signal;
   remodulating the secondary signal; and
   combining the remodulated secondary signal with the notch filtered signal.

2. The method of claim 1, further including the steps of:
   changing the demodulated signal from an original format to a format requiring less memory prior to comb filtering; and
   restoring the secondary signal to the original format after comb filtering but before combining with the notch filtered signal.

3. The method of claim 1, wherein the composite signal comprises a NTSC television signal.

4. The method of claim 3, wherein the primary signal comprises chrominance information and the secondary signal comprises luminance information.

5. A method of comb filtering a quadrature amplitude modulated signal to isolate a first signal component from a second signal component comprising:
   demodulating the quadrature amplitude modulated signal to form a demodulated signal;
   changing the demodulated signal from an input pixelized format to a new pixelized format to reduce storage requirements;
   time delaying the changed demodulated signal to form a demodulated time delayed signal; and
   combining the demodulated time delayed signal with the charged demodulated signal wherein the combining isolates the first signal component and the second signal component.

6. The method of claim 5, wherein the quadrature amplitude modulated signal comprises a composite video signal, and the first signal component comprises a chrominance component and the second signal component comprises a luminance component.

7. The method of claim 5, wherein demodulating comprises removing the subcarrier frequency from the quadrature amplitude modulated signal.

8. The method of claim 5, wherein the input pixelized format is a 4:4:4 format and the new pixelized format is a 4:2:2 format.

9. A luminance and chrominance separation system comprising:
   a notch filter configured to filter a composite signal to provide a first output signal representative of (Y−Y'), wherein a signal component Y' comprises luminance signal components from a luminance signal Y;
   a band pass filter configured to filter the composite signal to provide a second output signal representative of (C+Y'), wherein a signal C comprises a chrominance signal;
   a demodulator coupled with the band pass filter to demodulate the second output signal;
   a comb filter coupled with the demodulator, said comb filter having a first comb filter output and a second comb filter output, wherein said comb filter provides the signal C on said first comb filter output and the signal component Y' on said second comb filter output;
   a modulator coupled with said second comb filter output to modulate the signal component; and
   a summing point coupled with the modulator and the notch filter, said summing point combining the first output signal (Y−Y') and the signal component Y' to obtain the luminance signal Y.

10. The system of claim 9, wherein the composite signal comprises a composite signal conforming with a PAL standard.

11. The system of claim 9, wherein the notch filter is configured to filter frequencies between about 2.5 MHz and 4.5 MHz.

12. The system of claim 9, wherein the demodulator is configured to remove a subcarrier frequency component from the second output signal.

13. The system of claim 9, wherein the comb filter further comprises two or more line delays.

14. The system of claim 9, further comprising a first format manipulation module coupled between said demodulator and said comb filter, and a second format manipulation module coupled between said second comb filter output and said modulator.

15. The system of claim 14 wherein the first format manipulation module reduces memory requirements of a signal and the second format manipulation module restores memory requirements of a signal.

16. A comb filter having additive signal feedback for use with a quadrature amplitude modified signal having a primary component and a secondary component comprising:
   at least one input for receiving the quadrature amplitude modified signal;
   a format conversion module for reducing storage requirements for a reduced signal using a pixel reduction algorithm;

at least one line delay configured to delay said reduced signal and output a time delayed signal;

a first summing point configured to combine said reduced signal and said time delayed signal such that said summing point cancels said secondary component from said reduced signal, thereby outputting the primary component; and a second summing point coupled to an output of said first summing point and said at least one input, said second summing point subtracting said primary component from said reduced signal, thereby outputting said secondary component.

17. The comb filter of claim 16, further including at least one multiplier coupled to said first summing point and configured to adjust the amplitude of said time delayed signal.

18. The comb filter of claim 16, wherein said primary component comprises a chrominance signal and said secondary component comprises a luminance signal.

19. The comb filter of claim 16, further comprising a demodulator located in a path of said quadrature amplitude modified signal prior to said format conversion module.

20. The comb filter of claim 16, wherein the format conversion module creates the reduced signal by converting the quadrature amplitude modified signal from a 4:4:4 format to a 4:2:2 format, said comb filter further comprising:

a second format conversion module for restoring said secondary component to a 4:4:4 format.

21. A signal weighting system configured to dynamically assign signal weighting to luminance and chrominance components derived from different signal separation techniques, the signal weighting system comprising:

a line difference detector configured to detect the difference between scan lines in a video signal and calculate a luminance coefficient and a chrominance coefficient;

a luminance multiplexer coupled to said line difference detector and a first luminance filter output and a second luminance filter output; and a chrominance multiplexer coupled to said line difference detector and a first chrominance filter output and a second chrominance filter output;

wherein said luminance multiplexer receives said luminance coefficient from said line difference detector and based on said luminance coefficient selectively provides as its output said first luminance filter output or said second luminance filter output; and wherein said chrominance multiplexer receives said chrominance coefficient from said line difference detector and based on said chrominance coefficient selectively provides as its output said first chrominance filter output or said second chrominance filter output.

22. The signal weighting system of claim 21, wherein said luminance multiplexer and chrominance multiplexer are replaced by:

a first luminance multiplier coupled to said line difference detector and a first luminance signal output;

a second luminance multiplier coupled to said line difference detector and a second luminance signal output;

a luminance summing point coupled to said first luminance multiplier and said second luminance multiplier, said summing point configured to combine a weighted first luminance signal and a weighted second luminance signal;

a first chrominance multiplier coupled to said line difference detector and a first chrominance signal output;

a second chrominance multiplier coupled to said line difference detector and a second chrominance signal output; and a chrominance summing point coupled to said first chrominance multiplier and said second chrominance multiplier, said summing point configured to combine a weighted first chrominance signal and a weighted second chrominance signal.

* * * * *